US012028947B2

(12) United States Patent
Miskin et al.

(10) Patent No.: US 12,028,947 B2
(45) Date of Patent: Jul. 2, 2024

(54) COLOR TEMPERATURE CONTROLLED AND LOW THD LED LIGHTING DEVICES AND SYSTEMS AND METHODS OF DRIVING THE SAME

(71) Applicant: Lynk Labs, Inc., Elgin, IL (US)

(72) Inventors: Michael Miskin, Sleepy Hollow, IL (US); Robert L. Kottritsch, Shefford (GB)

(73) Assignee: Lynk Labs, Inc., Elgin, IL (US)

( * ) Notice: Subject to any disclaimer, the term of this patent is extended or adjusted under 35 U.S.C. 154(b) by 0 days.

(21) Appl. No.: 17/699,873

(22) Filed: Mar. 21, 2022

(65) Prior Publication Data

US 2022/0217825 A1 Jul. 7, 2022

Related U.S. Application Data

(63) Continuation of application No. 17/001,074, filed on Aug. 24, 2020, now Pat. No. 11,284,491, which is a (Continued)

(51) Int. Cl.
*H05B 45/44* (2020.01)
*H05B 45/20* (2020.01)
(Continued)

(52) U.S. Cl.
CPC ............ *H05B 45/42* (2020.01); *H05B 45/20* (2020.01); *H05B 45/24* (2020.01); *H05B 45/44* (2020.01); *H05B 45/46* (2020.01); *H05B 45/48* (2020.01)

(58) Field of Classification Search
CPC ........ H05B 45/20–28; H05B 45/10–18; H05B 45/46
See application file for complete search history.

(56) References Cited

U.S. PATENT DOCUMENTS 3,582,932 A 6/1971 Chapman
3,712,706 A 1/1973 Stamm
(Continued)

FOREIGN PATENT DOCUMENTS

AU 2003100206 4/2003
AU 2003100206 7/2003
(Continued)

OTHER PUBLICATIONS

Uhara , Translation of WO 2010140498 A1, Dec. 9, 2010 (Year: 2010).*

(Continued)

*Primary Examiner* — Renan Luque
(74) *Attorney, Agent, or Firm* — K&L Gates LLP

(57) ABSTRACT

An LED lighting device is disclosed. The example LED lighting device includes at least one LED circuit having at least two LEDs, where an LED of the at least two LEDs is configured to emit a different color temperature of white light than at least one other LED of the at least two LEDs. The example LED lighting device also includes a switch directly connected to the at least one LED circuit and configured to be manually switched by a user to change the color temperature of white light that is emitted from the at least one LED circuit. Switching the switch changes the color temperature of light emitted from the at least one LED circuit by dimming or increasing a brightness of the LED that is configured to emit the different color temperature of white light than the at least one other LED of the at least two LEDs.

20 Claims, 8 Drawing Sheets

Related U.S. Application Data continuation of application No. 16/440,884, filed on Jun. 13, 2019, now Pat. No. 10,757,783, which is a continuation of application No. 15/369,218, filed on Dec. 5, 2016, now Pat. No. 10,349,479, which is a continuation of application No. 15/005,108, filed on Jan. 25, 2016, now Pat. No. 9,516,716, which is a continuation of application No. 14/362,173, filed as application No. PCT/US2012/067623 on Dec. 3, 2012, now Pat. No. 9,247,597, which is a continuation-in-part of application No. PCT/US2012/051531, filed on Aug. 20, 2012.

(60) Provisional application No. 61/570,200, filed on Dec. 13, 2011, provisional application No. 61/630,025, filed on Dec. 2, 2011.

(51) Int. Cl.

| | |
|---|---|
| ***H05B 45/24*** | (2020.01) |
| ***H05B 45/42*** | (2020.01) |
| ***H05B 45/46*** | (2020.01) |
| ***H05B 45/48*** | (2020.01) |

(56) References Cited

U.S. PATENT DOCUMENTS 3,821,662 A 6/1974 Dewinter et al.
3,869,641 A 3/1975 Goldberg
3,981,023 A 9/1976 King et al.
4,104,562 A 8/1978 DiCola
4,145,655 A 3/1979 Caudel et al.
4,170,018 A 10/1979 Runge
4,218,627 A 8/1980 Kiesel
4,246,533 A 1/1981 Chiang
4,271,408 A 5/1981 Teshima et al.
4,298,869 A 11/1981 Okuno
4,350,973 A 9/1982 Petryk, Jr.
4,506,318 A 3/1985 Nilssen
4,530,973 A 7/1985 Koster et al.
4,535,203 A 8/1985 Jenkins et al.
4,563,592 A 1/1986 Yuhasz et al.
4,573,766 A 3/1986 Bournay, Jr. et al.
4,653,895 A 3/1987 Deguchi et al.
4,654,880 A 3/1987 Sontag
4,646,398 A 4/1987 Michael et al.
4,656,398 A 4/1987 Michael et al.
4,691,341 A 9/1987 Knoble et al.
4,780,621 A 10/1988 Bartleucci et al.
4,797,651 A 1/1989 Havel
4,816,698 A 3/1989 Hook
RE33,285 E 7/1990 Kunen
4,962,347 A 10/1990 Burroughs et al.
5,010,459 A 4/1991 Taylor et al.
5,014,052 A 5/1991 Obeck
5,028,859 A 7/1991 Johnson et al.
5,086,294 A 2/1992 Kasegi
5,180,952 A 3/1993 Nilssen
5,267,134 A 11/1993 Banayan
5,293,494 A 3/1994 Saito et al.
5,324,316 A 6/1994 Schulman et al.
5,353,213 A 10/1994 Paulik et al.
5,408,330 A 4/1995 Squicciarini et al.
5,430,609 A 7/1995 Kikinis
5,442,258 A 8/1995 Shibata
5,457,450 A 10/1995 Deese et al.
5,463,280 A 10/1995 Johnson
5,469,020 A 11/1995 Herrick
5,519,263 A 5/1996 Santana, Jr.
5,521,652 A 5/1996 Shalvi
5,532,641 A 7/1996 Balasubramanian et al.
5,550,066 A 8/1996 Tang et al.
5,562,240 A 10/1996 Campbell
5,596,567 A 1/1997 DeMuro et al.
5,621,225 A 4/1997 Shieh et al.
5,636,303 A 6/1997 Che et al.
5,652,609 A 7/1997 Scholler et al.
5,657,054 A 8/1997 Files et al.
5,661,645 A 8/1997 Hochstein
5,663,719 A 9/1997 Deese et al.
5,684,738 A 11/1997 Au et al.
5,699,218 A 12/1997 Kadah
5,739,639 A 4/1998 Johnson
5,785,418 A 7/1998 Hochstein
5,790,013 A 8/1998 Hauck
5,790,106 A 8/1998 Hirano et al.
5,803,579 A 9/1998 Turnbull et al.
5,806,965 A 9/1998 Deese
5,828,768 A 10/1998 Eatwell et al.
5,847,507 A 12/1998 Butterworth et al.
5,874,803 A 2/1999 Garbuzov et al.
5,923,239 A 7/1999 Krueger et al.
5,936,599 A 8/1999 Reymond
5,946,348 A 8/1999 Mizutani et al.
5,963,012 A 10/1999 Garcia et al.
5,965,907 A 10/1999 Huang et al.
5,973,677 A 10/1999 Gibbons
5,982,103 A 11/1999 Mosebrook et al.
5,998,925 A 12/1999 Shimizu et al.
6,016,038 A 1/2000 Mueller
6,019,493 A 2/2000 Kuo et al.
6,023,073 A 2/2000 Strite
6,028,694 A 2/2000 Schmidt
6,061,259 A 5/2000 DeMichele
6,072,475 A 6/2000 van Ketwich
6,078,148 A 6/2000 Hochstein
6,107,744 A 8/2000 Bavaro et al.
6,157,551 A 12/2000 Barak et al.
6,164,368 A 12/2000 Furukawa et al.
6,184,628 B1 2/2001 Ruthenberg
6,211,626 B1 4/2001 Lys et al.
6,227,679 B1 5/2001 Zhang et al.
6,234,648 B1 5/2001 Borner
6,246,169 B1 6/2001 Pruvot
6,246,862 B1 6/2001 Grivas et al.
6,265,984 B1 7/2001 Molinaroli
6,292,901 B1 9/2001 Lys et al.
6,300,725 B1 10/2001 Zinkler et al.
6,300,748 B1 10/2001 Miller
6,303,238 B1 10/2001 Thompson et al.
6,307,757 B1 10/2001 Porter et al.
6,319,778 B1 11/2001 Chen et al.
6,323,652 B1 11/2001 Collier et al.
6,324,082 B1 11/2001 Keller
6,329,694 B1 12/2001 Lee et al.
6,357,889 B1 3/2002 Duggal et al.
6,361,886 B2 3/2002 Shi et al.
6,362,789 B1 3/2002 Trumbull et al.
6,380,693 B1 4/2002 Kastl
6,396,001 B1 5/2002 Nakamura
6,396,801 B1 5/2002 Upton et al.
6,404,131 B1 6/2002 Kawano et al.
6,411,045 B1 6/2002 Nerone
6,412,971 B1 7/2002 Wojnarowski et al.
6,439,731 B1 8/2002 Johnson et al.
6,441,558 B1 8/2002 Muthu et al.
6,456,481 B1 9/2002 Stevenson
6,466,198 B1 10/2002 Feinstein
6,489,724 B1 12/2002 Smith et al.
6,489,754 B2 12/2002 Blom
6,501,100 B1 12/2002 Srivastava et al.
6,507,159 B2 1/2003 Muthu
6,510,995 B2 1/2003 Muthu et al.
6,528,954 B1 3/2003 Lys et al.
6,529,126 B1 3/2003 Henry
6,541,800 B2 4/2003 Thomas et al.
6,548,967 B1 4/2003 Dowling et al.
6,559,802 B2 5/2003 Goto et al.
6,577,072 B2 6/2003 Saito et al.
6,580,228 B1 6/2003 Chen et al.
6,600,243 B1 7/2003 Hara et al.
6,618,042 B1 9/2003 Powell
6,633,120 B2 10/2003 Salam

(56) References Cited

U.S. PATENT DOCUMENTS 6,636,003 B2 10/2003 Rahm et al.
6,636,005 B2 10/2003 Wacyk et al.
6,643,336 B1 11/2003 Hsieh et al.
6,663,246 B2 12/2003 Currens et al.
6,664,744 B2 12/2003 Dietz
6,686,697 B2 2/2004 Cho et al.
6,689,626 B2 2/2004 Krijin et al.
6,714,348 B2 3/2004 Dunn
6,717,353 B1 4/2004 Mueller et al.
6,722,771 B1 4/2004 Stephens
6,774,582 B1 8/2004 Kwong et al.
6,781,329 B2 8/2004 Mueller et al.
6,781,570 B1 8/2004 Arrigo et al.
6,803,732 B2 10/2004 Kraus et al.
6,814,642 B2 11/2004 Siwinski et al.
6,832,729 B1 12/2004 Perry et al.
6,844,675 B2 1/2005 Yang
6,850,169 B2 2/2005 Manavi et al.
6,856,103 B1 2/2005 Hudson et al.
6,861,658 B2 3/2005 Fiset
6,879,319 B2 4/2005 Cok
6,879,497 B2 4/2005 Hua et al.
6,882,128 B1 4/2005 Rahmel et al.
6,891,786 B2 5/2005 Sato
6,907,089 B2 6/2005 Jensen et al.
6,936,936 B2 8/2005 Fischer et al.
6,949,772 B2 9/2005 Shimizu et al.
6,965,205 B2 11/2005 Piepgras et al.
6,988,053 B2 1/2006 Namaky
7,014,336 B1 3/2006 Ducharne et al.
7,019,062 B2 3/2006 Van Beek et al.
7,019,662 B2 3/2006 Shackle
7,038,399 B2 5/2006 Lys et al.
7,038,400 B2 5/2006 Rimmer et al.
7,044,627 B2 5/2006 Mertz et al.
7,053,560 B1 5/2006 Ng
7,064,498 B2 6/2006 Dowling et al.
7,081,722 B1 7/2006 Huynh et al.
7,161,590 B2 1/2007 Daniels
7,176,885 B2 2/2007 Troxell et al.
7,180,265 B2 2/2007 Naskali et al.
7,202,613 B2 4/2007 Morgan et al.
7,204,607 B2 4/2007 Yano et al.
7,213,940 B1 5/2007 Van De Ven et al.
7,226,442 B2 6/2007 Sheppard, Jr. et al.
7,226,644 B2 6/2007 Sheppard, Jr. et al.
7,262,559 B2 8/2007 Tripathi et al.
7,264,378 B2 9/2007 Loh
7,271,568 B2 9/2007 Purdy et al.
7,288,902 B1 10/2007 Melanson
7,344,279 B2 3/2008 Mueller et al.
7,348,957 B2 3/2008 Cui et al.
7,375,476 B2 5/2008 Scott et al.
7,462,997 B2 12/2008 Mueller et al.
7,489,086 B2 2/2009 Miskin et al.
7,583,901 B2 9/2009 Nakagawa et al.
7,748,877 B1 7/2010 Colby
7,808,189 B2 10/2010 Hollnberger et al.
7,852,009 B2 12/2010 Coleman et al.
7,859,196 B2 12/2010 Lee et al.
RE42,161 E 2/2011 Hochstein
8,055,310 B2 11/2011 Beart et al.
8,080,819 B2 12/2011 Mueller et al.
8,148,905 B2 4/2012 Miskin et al.
8,179,055 B2 5/2012 Miskin et al.
8,193,730 B2 6/2012 Vos
8,198,819 B2 6/2012 Lenk
8,272,757 B1 9/2012 Fan et al.
8,314,571 B2 11/2012 Jonsson
8,326,225 B2 12/2012 Oba et al.
8,362,695 B2 1/2013 Aanegola et al.
8,373,363 B2 2/2013 Zdenko
8,400,081 B2 3/2013 Catalano et al.
8,471,495 B2 6/2013 Muguruma et al.
8,476,836 B2 7/2013 Van de Ven et al.
8,531,118 B2 9/2013 Miskin et al.
8,573,797 B2 11/2013 Spartano et al.
8,587,205 B2 11/2013 Ter Weeme et al.
8,614,103 B2 12/2013 Sabbadini et al.
8,643,308 B2 2/2014 Grajcar
8,648,539 B2 2/2014 Miskin et al.
8,710,754 B2 4/2014 Baddela et al.
8,762,562 B2 6/2014 Wormington et al.
8,766,548 B2 7/2014 Chew
8,841,855 B2 9/2014 Miskin
9,112,957 B2 9/2015 Beart et al.
9,184,497 B2 11/2015 Chen et al.
9,198,237 B2 11/2015 Miskin
9,247,597 B2 1/2016 Miskin et al.
9,380,665 B2 6/2016 Grajcar et al.
9,426,855 B2 8/2016 Lee et al.
9,516,716 B2 12/2016 Miskin et al.
9,615,420 B2 4/2017 Miskin
9,807,827 B2 10/2017 Miskin et al.
10,091,842 B2 10/2018 Miskin et al.
10,154,551 B2 12/2018 Miskin et al.
10,178,715 B2 1/2019 Miskin et al.
10,349,479 B2 7/2019 Miskin et al.
10,492,251 B2 11/2019 Miskin et al.
10,492,252 B2 11/2019 Miskin et al.
10,499,466 B1 12/2019 Miskin et al.
10,506,674 B2 12/2019 Miskin et al.
10,517,149 B2 12/2019 Miskin et al.
10,537,001 B2 1/2020 Miskin et al.
10,575,376 B2 2/2020 Miskin et al.
10,687,400 B2 6/2020 Miskin et al.
10,750,583 B2 8/2020 Miskin
10,757,783 B2 8/2020 Miskin et al.
10,932,341 B2 2/2021 Miskin et al.
10,966,298 B2 3/2021 Miskin et al.
11,019,697 B2 5/2021 Miskin et al.
2001/0005319 A1 6/2001 Ohishi et al.
2001/0054005 A1 12/2001 Hook et al.
2002/0014630 A1 2/2002 Okazaki et al.
2002/0021573 A1 2/2002 Zhang
2002/0030193 A1 3/2002 Yamazaki et al.
2002/0030194 A1 3/2002 Camras et al.
2002/0048169 A1 4/2002 Dowlling et al.
2002/0048177 A1 4/2002 Rahm et al.
2002/0060526 A1 5/2002 Timmermans et al.
2002/0060530 A1 5/2002 Sembhi et al.
2002/0070914 A1 6/2002 Bruning et al.
2002/0072395 A1 6/2002 Miramontes
2002/0080010 A1 6/2002 Zhang
2002/0081982 A1 6/2002 Schwartz et al.
2002/0086702 A1 7/2002 Lai et al.
2002/0113244 A1 8/2002 Barnett et al.
2002/0113246 A1 8/2002 Nagai et al.
2002/0118557 A1 8/2002 Ohlsson
2002/0130627 A1 9/2002 Morgan
2002/0137258 A1 9/2002 Akram
2002/0145392 A1 10/2002 Hair et al.
2002/0149572 A1 10/2002 Schulz et al.
2002/0158590 A1 10/2002 Saito et al.
2002/0163006 A1 11/2002 Sundar et al.
2002/0167016 A1 11/2002 Hoelen et al.
2002/0175870 A1 11/2002 Gleener
2002/0176259 A1 11/2002 Ducharme
2002/0181231 A1 12/2002 Luk
2002/0187675 A1 12/2002 McMullin et al.
2002/0191029 A1 12/2002 Gillespie et al.
2002/0195968 A1 12/2002 Sanford et al.
2003/0001657 A1 1/2003 Worley
2003/0011972 A1 1/2003 Koo
2003/0015968 A1 1/2003 Allen
2003/0020629 A1 1/2003 Swartz et al.
2003/0035075 A1 2/2003 Butler et al.
2003/0038291 A1 2/2003 Cao
2003/0043611 A1 3/2003 Bockle et al.
2003/0063462 A1 4/2003 Shimuzu et al.
2003/0072145 A1 4/2003 Nolan et al.
2003/0076306 A1 4/2003 Zadesky et al.
2003/0085621 A1 5/2003 Potega
2003/0085870 A1 5/2003 Hinckley

(56) References Cited

U.S. PATENT DOCUMENTS

| | | | | |
|---|---|---|---|---|
| 2003/0102810 | A1 | 6/2003 | Cross et al. | |
| 2003/0100837 | A1 | 7/2003 | Piepgras et al. | |
| 2003/0122502 | A1 | 7/2003 | Clauberg et al. | |
| 2003/0137258 | A1 | 7/2003 | Piepgras et al. | |
| 2003/0144034 | A1 | 7/2003 | Hack et al. | |
| 2003/0146897 | A1 | 8/2003 | Hunter | |
| 2003/0169014 | A1 | 9/2003 | Kadah | |
| 2003/0175004 | A1 | 9/2003 | Garito et al. | |
| 2003/0185005 | A1 | 10/2003 | Sommers et al. | |
| 2003/0219035 | A1 | 11/2003 | Schmidt | |
| 2003/0230934 | A1 | 12/2003 | Cordelli et al. | |
| 2003/0231168 | A1 | 12/2003 | Bell et al. | |
| 2003/0234621 | A1 | 12/2003 | Kriparos | |
| 2004/0022058 | A1 | 2/2004 | Birrell | |
| 2004/0041620 | A1 | 3/2004 | D'Angelo et al. | |
| 2004/0080941 | A1 | 4/2004 | Jiang et al. | |
| 2004/0105264 | A1 | 6/2004 | Spero | |
| 2004/0108997 | A1 | 6/2004 | Lee | |
| 2004/0130909 | A1 | 7/2004 | Mueller et al. | |
| 2004/0150994 | A1 | 8/2004 | Kazar et al. | |
| 2004/0164948 | A1 | 8/2004 | Kabel et al. | |
| 2004/0183380 | A1 | 9/2004 | Otake | |
| 2004/0189218 | A1 | 9/2004 | Leong et al. | |
| 2004/0201988 | A1 | 10/2004 | Allen | |
| 2004/0206970 | A1 | 10/2004 | Martin | |
| 2004/0207484 | A1 | 10/2004 | Forrester et al. | |
| 2004/0212321 | A1 | 10/2004 | Lys et al. | |
| 2004/0218387 | A1 | 11/2004 | Gerlach | |
| 2004/0263084 | A1 | 12/2004 | Mor et al. | |
| 2004/0264193 | A1 | 12/2004 | Okumura | |
| 2004/0266349 | A1 | 12/2004 | Wang | |
| 2005/0001225 | A1 | 1/2005 | Yoshimura et al. | |
| 2005/0058852 | A1 | 3/2005 | Tyan et al. | |
| 2005/0078093 | A1 | 4/2005 | Peterson, Jr. et al. | |
| 2005/0110426 | A1 | 5/2005 | Shao | |
| 2005/0111234 | A1 | 5/2005 | Martin et al. | |
| 2005/0116235 | A1 | 6/2005 | Schultz et al. | |
| 2005/0128751 | A1 | 6/2005 | Roberge et al. | |
| 2005/0158590 | A1 | 7/2005 | Li | |
| 2005/0173990 | A1 | 8/2005 | Anderson et al. | |
| 2005/0185401 | A1 | 8/2005 | Jiang et al. | |
| 2005/0230600 | A1 | 10/2005 | Olson et al. | |
| 2005/0231133 | A1 | 10/2005 | Lys | |
| 2005/0276053 | A1 | 12/2005 | Nortrup et al. | |
| 2006/0038542 | A1 | 2/2006 | Park et al. | |
| 2006/0091415 | A1 | 5/2006 | Yan | |
| 2006/0099994 | A1 | 5/2006 | Yang et al. | |
| 2006/0103913 | A1 | 5/2006 | Handschy et al. | |
| 2006/0138971 | A1 | 6/2006 | Uang et al. | |
| 2006/0158130 | A1 | 7/2006 | Furukawa | |
| 2006/0163589 | A1 | 7/2006 | Fan et al. | |
| 2006/0176692 | A1 | 8/2006 | Lee et al. | |
| 2007/0024213 | A1 | 2/2007 | Shtenyberg et al. | |
| 2007/0069663 | A1 | 3/2007 | Burdalski et al. | |
| 2007/0171145 | A1 | 7/2007 | Coleman et al. | |
| 2007/0258231 | A1 | 11/2007 | Koerner et al. | |
| 2007/0273299 | A1* | 11/2007 | Miskin .................. | H05B 45/39 315/250 |
| 2007/0290625 | A1 | 12/2007 | He | |
| 2008/0094005 | A1 | 4/2008 | Rabiner et al. | |
| 2008/0094837 | A1 | 4/2008 | Dobbins et al. | |
| 2008/0116816 | A1 | 5/2008 | Neuman et al. | |
| 2008/0116818 | A1 | 5/2008 | Shteynberg et al. | |
| 2008/0136347 | A1 | 6/2008 | Lin et al. | |
| 2008/0158915 | A1 | 7/2008 | Williams | |
| 2008/0203405 | A1 | 8/2008 | Rooymans | |
| 2008/0203936 | A1 | 8/2008 | Mariyama et al. | |
| 2008/0211421 | A1 | 9/2008 | Lee et al. | |
| 2008/0218098 | A1 | 9/2008 | Lee et al. | |
| 2008/0218995 | A1 | 9/2008 | Gilkey | |
| 2008/0252197 | A1 | 10/2008 | Li et al. | |
| 2009/0017433 | A1 | 1/2009 | Belsky et al. | |
| 2009/0221185 | A1 | 1/2009 | Ng | |
| 2009/0079362 | A1 | 3/2009 | Shteynberg et al. | |
| 2009/0160358 | A1 | 6/2009 | Slava | |
| 2009/0160361 | A1 | 6/2009 | Shakuda | |
| 2009/0167202 | A1 | 7/2009 | Miskin et al. | |
| 2009/0174337 | A1 | 7/2009 | Miskin et al. | |
| 2009/0295300 | A1 | 12/2009 | King | |
| 2010/0039794 | A1 | 2/2010 | Ghanem et al. | |
| 2010/0109558 | A1 | 5/2010 | Chew | |
| 2010/0109564 | A1 | 5/2010 | Shin et al. | |
| 2010/0134038 | A1 | 6/2010 | Shackle | |
| 2010/0141177 | A1 | 6/2010 | George | |
| 2010/0259183 | A1 | 10/2010 | Leshniak | |
| 2010/0308738 | A1 | 12/2010 | Shteynberg et al. | |
| 2010/0308739 | A1 | 12/2010 | Shteynberg et al. | |
| 2010/0308743 | A1 | 12/2010 | Liang et al. | |
| 2010/0320934 | A1 | 12/2010 | Liu | |
| 2011/0057572 | A1 | 3/2011 | Kit et al. | |
| 2011/0115407 | A1 | 5/2011 | Wibben et al. | |
| 2011/0148327 | A1 | 6/2011 | Van de Ven et al. | |
| 2011/0183368 | A1 | 7/2011 | Chapman | |
| 2011/0193484 | A1 | 8/2011 | Harbers et al. | |
| 2011/0260622 | A1 | 10/2011 | Hartikka et al. | |
| 2011/0273098 | A1 | 11/2011 | Grajcar | |
| 2011/0298393 | A1 | 12/2011 | Chew | |
| 2012/0043897 | A1 | 2/2012 | Miskin et al. | |
| 2012/0049742 | A1 | 3/2012 | Lee et al. | |
| 2012/0069560 | A1 | 3/2012 | Miskin et al. | |
| 2012/0081009 | A1 | 4/2012 | Shteynberg et al. | |
| 2012/0228529 | A1 | 9/2012 | Trewin | |
| 2012/0262065 | A1* | 10/2012 | Rowlette, Jr. .......... | H05B 45/50 315/297 |
| 2012/0268008 | A1 | 10/2012 | Miskin et al. | |
| 2012/0293083 | A1 | 11/2012 | Miskin et al. | |
| 2013/0002167 | A1 | 1/2013 | Van de Ven | |
| 2013/0043799 | A1* | 2/2013 | Siu ......................... | H05B 45/30 315/193 |
| 2013/0049602 | A1 | 2/2013 | Raj et al. | |
| 2013/0051001 | A1 | 2/2013 | Miskin | |
| 2013/0063035 | A1* | 3/2013 | Baddela ............. | H05B 45/3577 315/192 |
| 2013/0069535 | A1 | 3/2013 | Athalye | |
| 2013/0082611 | A1 | 4/2013 | Cohen | |
| 2013/0093325 | A1 | 4/2013 | Scarpelli | |
| 2013/0119896 | A1 | 5/2013 | Fukano et al. | |
| 2014/0063837 | A1 | 3/2014 | Rowlette, Jr. | |
| 2014/0084801 | A1 | 3/2014 | Lys | |
| 2014/0111091 | A1 | 4/2014 | Grajcar et al. | |
| 2014/0153232 | A1 | 6/2014 | Miskin et al. | |
| 2014/0159584 | A1 | 6/2014 | Grajcar | |
| 2014/0239809 | A1 | 8/2014 | Miskin | |
| 2014/0285102 | A1 | 9/2014 | Jain et al. | |
| 2014/0361696 | A1 | 12/2014 | Siessegger et al. | |
| 2014/0361697 | A1 | 12/2014 | Miskin et al. | |
| 2015/0115823 | A1 | 4/2015 | Serra et al. | |
| 2015/0216006 | A1 | 7/2015 | Lee et al. | |
| 2016/0095180 | A1 | 3/2016 | Miskin | |
| 2016/0143097 | A1 | 5/2016 | Miskin | |
| 2016/0188426 | A1 | 6/2016 | Kousha et al. | |
| 2017/0354005 | A1 | 12/2017 | Miskin et al. | |
| 2019/0045593 | A1 | 2/2019 | Miskin et al. | |
| 2019/0182919 | A1 | 6/2019 | Miskin et al. | |
| 2019/0268982 | A1 | 8/2019 | Miskin et al. | |
| 2019/0306940 | A1 | 10/2019 | Miskin et al. | |
| 2019/0313491 | A1 | 10/2019 | Miskin et al. | |
| 2019/0350053 | A1 | 11/2019 | Miskin et al. | |

FOREIGN PATENT DOCUMENTS

| | | | |
|---|---|---|---|
| AU | 2003100206 | | 7/2013 |
| CN | 1341966 | A | 3/2002 |
| EP | 0515664 | | 12/1992 |
| EP | 1160883 | | 12/2001 |
| EP | 1215944 | | 6/2002 |
| EP | 1502483 | | 2/2005 |
| EP | 1 953 825 | B1 | 8/2008 |
| EP | 1953825 | | 8/2008 |
| EP | 1953825 | B1 | 7/2013 |
| GB | 2202414 | | 3/1987 |
| GB | 2202414 | | 9/1988 |
| GB | 2202414 | A | 9/1988 |
| GB | 2264555 | | 9/1993 |

(56) References Cited

FOREIGN PATENT DOCUMENTS

| | | | | |
|---|---|---|---|---|
| GB | 2372609 | | 8/2002 | |
| IL | 123123 | | 3/2004 | |
| JP | 08-137429 | | 5/1996 | |
| JP | H08149063 | | 6/1996 | |
| JP | 11-016683 | | 1/1999 | |
| JP | 11-330561 | | 11/1999 | |
| JP | 2000030877 | | 1/2000 | |
| JP | 200050512 | | 2/2000 | |
| JP | 2000278383 | A | 10/2000 | |
| JP | 2001004753 | A | 1/2001 | |
| JP | 2001176677 | | 6/2001 | |
| JP | 2001284065 | | 12/2001 | |
| JP | 2002050798 | A | 2/2002 | |
| JP | 2002208301 | A | 7/2002 | |
| JP | 2003047177 | A | 2/2003 | |
| JP | 2004-111104 | | 4/2004 | |
| JP | 2005-524960 | | 8/2005 | |
| JP | 2011-040701 | | 2/2011 | |
| JP | 2011159495 | | 8/2011 | |
| KR | 100367215 | B1 | 1/2003 | |
| KR | 20030073747 | A | 9/2003 | |
| WO | 9750168 | | 12/1997 | |
| WO | 1997050168 | | 12/1997 | |
| WO | 99/20085 | | 4/1999 | |
| WO | 9922338 | | 5/1999 | |
| WO | 9939319 | | 8/1999 | |
| WO | 0101385 | | 1/2001 | |
| WO | 2001001385 | | 1/2001 | |
| WO | 0215320 | | 2/2002 | |
| WO | 0221741 | A1 | 3/2002 | |
| WO | 0223956 | | 3/2002 | |
| WO | 2002023956 | | 3/2002 | |
| WO | WO02/23956 | | 3/2002 | |
| WO | 0231406 | | 4/2002 | |
| WO | 02062623 | | 8/2002 | |
| WO | 03009535 | A1 | 1/2003 | |
| WO | 03/026358 | | 3/2003 | |
| WO | 2003019072 | | 3/2003 | |
| WO | 2004055654 | A2 | 7/2004 | |
| WO | 2005084080 | | 9/2005 | |
| WO | 2006023149 | | 3/2006 | |
| WO | 2007/093938 | | 8/2007 | |
| WO | 2008124701 | | 10/2008 | |
| WO | 2010016002 | | 2/2010 | |
| WO | 2010138211 | | 2/2010 | |
| WO | 2010035155 | | 4/2010 | |
| WO | 2010/106375 | | 9/2010 | |
| WO | 2010103480 | | 9/2010 | |
| WO | 2010126601 | | 11/2010 | |
| WO | 20101266011 | | 11/2010 | |
| WO | 2010138211 | | 12/2010 | |
| WO | 20100138211 | | 12/2010 | |
| WO | WO-2010140498 | A1 * | 12/2010 | ......... H05B 33/0857 |
| WO | 2011082168 | | 7/2011 | |
| WO | 2011/143510 | | 11/2011 | |
| WO | 2011143510 | | 11/2011 | |
| WO | 20110143510 | | 11/2011 | |
| WO | 2013026053 | | 2/2013 | |
| WO | 2013082609 | | 6/2013 | |
| WO | 2016164928 | | 10/2016 | |
| WO | 2010138211 | | 12/2020 | |

OTHER PUBLICATIONS

*Lynk Labs, Inc.*, v. *Home Depot USA, Inc. The Home Dept Inc., and Home Depot Product Authority, LLC*, Case No. 6:21-cv-00097-ADA, Home Depot's Preliminary Invalidity Contentions and Additional Disclosure Pursuant to Scheduling Order dated Aug. 18, 2021—22 pages.

U.S. Pat. No. 10,492,251 ('251 Patent)—Exhibit A-01—Takeo '301.

U.S. Pat. No. 10,492,251 ('251 Patent)—Exhibit A-02—Lynam '623.

U.S. Pat. No. 10,492,251 ('251 Patent)—Exhibit A-03—Filipovsky '319.

U.S. Pat. No. 10,492,251 ('251 Patent)—Exhibit A-04 Deese '719.

U.S. Pat. No. 10,492,251 ('251 Patent)—Exhibit A-05 Okuno.

U.S. Pat. No. 10,492,251 ('251 Patent)—Exhibit A-06—Ohishi '319.

U.S. Pat. No. 10,492,251 ('251 Patent)—Exhibit A-07 Teshima.

U.S. Pat. No. 10,349,479 ("'479 Patent")—Exhibit B-01 Dowling.

U.S. Pat. No. 10,349,479 ("'479 Patent")—B-02 Ter Weeme.

U.S. Pat. No. 10,349,479 ("'479 Patent")—Exhibit B-03 Lin.

U.S. Pat. No. 10,349,479 ("'479 Patent")—Exhibit B-04 Lys '483.

U.S. Pat. No. 10,349,479 ("'479 Patent")—Exhibit B-05 Leong '814.

U.S. Pat. No. 10,349,479 ("'479 Patent")—Exhibit B-06 Calon.

U.S. Pat. No. 10,349,479 ("'479 Patent")—Exhibit B-07 Nakagawara.

U.S. Pat. No. 10,757,783 ("'783 Patent")—Exhibit C-01 Grajcar.

U.S. Pat. No. 10,757,783 ("'783 Patent")—Exhibit C-02 Reymond.

U.S. Pat. No. 10,757,783 ("'783 Patent")—Exhibit C-03 Walter.

U.S. Pat. No. 10,757,783 ("'783 Patent")—Exhibit C-04 Lyos '901.

U.S. Pat. No. 10,757,783 ("'783 Patent")—Exhibit C-05 Hair.

U.S. Pat. No. 10,757,783 ("'783 Patent")—Exhibit C-06 Cho.

U.S. Pat. No. 10,757,783 ("'783 Patent")—Exhibit C-07 Coleman.

U.S. Pat. No. 10,757,783 ("'783 Patent")—Exhibit C-08 Shimizu.

U.S. Pat. No. 10,154,551 ("'551 Patent")—Exhibit D-01 Saito.

U.S. Pat. No. 10,154,551 ("'551 Patent")—Exhibit D-02 Hochstein '168.

U.S. Pat. No. 10,154,551 ("'551 Patent")—Exhibit D-03 Reymond.

U.S. Pat. No. 10,154,551 ("'551 Patent")—Exhibit D-04 Panagotacos.

U.S. Pat. No. 10,154,551 ("'551 Patent")—Exhibit D-05 Liu.

U.S. Pat. No. 10,154,551 ("'551 Patent")—Exhibit D-06 Deese 450.

U.S. Pat. No. 10,154,551 ("'551 Patent")—Exhibit D-07 Lys.

U.S. Pat. No. 10,154,551 ("'551 Patent")—Exhibit D-08 Shimizu.

U.S. Pat. No. 10,517,149 ("'149 Patent")—Exhibit E-01 Takahashi.

U.S. Pat. No. 10,517,149 ("'149 Patent")—Exhibit E-02 Saito '590.

U.S. Pat. No. 10,517,149 ("'149 Patent")—Exhibit E-03 Lys '399.

U.S. Pat. No. 10,517,149 ("'149 Patent")—Exhibit E-04 Catalano '081.

U.S. Pat. No. 10,517,149 ("'149 Patent")—Exhibit E-05 Deese '719.

U.S. Pat. No. 10,652,979 ("'979 Patent")—Exhibit F-01 Coats '555.

U.S. Pat. No. 10,652,979 ("'979 Patent")—Exhibit F-02 Birrell '406.

U.S. Pat. No. 10,652,979 ("'979 Patent")—Exhibit F-03 Muthu '159.

U.S. Pat. No. 10,652,979 ("'979 Patent")—Exhibit F-04 Teshima '408.

U.S. Pat. No. 10,652,979 ("'979 Patent")—Exhibit F-05 Takeo.

U.S. Pat. No. 10,652,979 ("'979 Patent")—Exhibit F-06 Deese '719.

U.S. Appl. No. 60/839,453, filed Aug. 23, 2006, entitled "Lighting Device and Lighting Method" to Van de Ven and Negley, ("453 Provisional").

U.S. Appl. No. 60/793,524, filed Apr. 20, 2006, entitled "Lighting Device and Lighting Method" to Van de Ven and Negley, ("524 Provisional").

U.S. Appl. No. 60/844,325, filed Sep. 13, 2006, entitled "Boost/Flyback Power Supply Topology With Low Side MOSFET Current Control" to Myers ("Myers").

Interim LED Purchase Specifications of the Institute of Transportation Engineers, Jul. 1998 ("1998 Specification").

"Comparison of Control Options in Private Offices in an Advanced Lighting Controls Testbed," by Judith D. Jennings et al., and published in Apr. 1999 ("Jennings").

Vehicle Detection Using a Magetic Field Sensor, by Stanely V. Marshall, and published in May 1978 ("Marshall").

*Samsung Electronics Co., Ltd.* v. *Lynk Labs, Inc.* U.S. Pat. No. 10,517,149 Petition for Inter Partes Review of U.S. Pat. No. 10,517,149, 98 pages.

*Samsung Electronics Co., Ltd.* v. *Lynk Labs, Inc.* U.S. Pat. No. 10,517,149 Power of Attorney for Petitioner Samsung Electronics Co., Ltd. 3 pages.

(56) References Cited

OTHER PUBLICATIONS

*Samsung Electronics Co., Ltd. et al.* v. *Lynk Labs, Inc.* Case IPR2022-00098, U.S. Pat. No. 10,4517,149 Notice of Filing Date Accorded to Petition, mailed Nov. 23, 2021, 6 pages.
*Samsung Electronics Co., Ltd.* v. *Lynk Labs, Inc.* Case: IPR2022-00098, U.S. Pat. No. 10,517,149 Patent Owner's Mandatory Notices Pursuant to 37 C.F.R. Section 42.8, 5 pages.
*Samsung Electronics Co., Ltd.* v. *Lynk Labs, Inc.*, U.S. Pat. No. 10,517,149 Declaration of R. Jacob Baker, Ph.D., P.E. in Support of Petition for Inter Partes Review of U.S. Pat. No. 10,517,149, 179 pages—Ex. 1002.
R. Jacob (Jake) Baker, Ph.D., P.E. CV, 37 pages—Ex. 1003.
File History of U.S. Pat. No. 10,517,149, 359 pages—Ex. 1004.
Watson Mastering Electronics, Third Edition, pp. 1-151—Ex. 1018.
PCT File History US/2010/62235, filed Dec. 28, 2010—Ex. 1039.
PCT File History US/2010/001597, filed May 28, 2010—Ex. 1043.
PCT File History US/2010/001269, filed Apr. 30, 2010—Ex. 1044.
U.S. Appl. No. 61/333,963, filed May 12, 2010—Ex. 1046.
U.S. Appl. No. 61/284,927, filed Dec. 28, 2009—Ex. 1047.
U.S. Appl. No. 60/335,963, filed Dec. 31, 2009—Ex. 1048.
U.S. Appl. No. 60/997,771, filed Oct. 6, 2007—Ex. 1049.
U.S. Appl. No. 60/547,653, filed Feb. 25, 2004—Ex. 1050.
U.S. Appl. No. 60/559,867, filed Feb. 25, 2004—Ex. 1051.
U.S. Appl. No. 61/217,215, filed May 28, 2009—Ex. 1052.
U.S. Appl. No. 61/215,144, filed May 1, 2009—Ex. 1053.
Civil Docket for Case# 6:21-cv-02665, Northern District of Illinois, Samsung Electronics. Co., Ltd., filed May 17, 2021, 14 pages—Ex. 1061.
US District Court for the Northern District of Illinois, Estimated Patent Case Schedule, 2 pages—Ex. 1062.
*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, Aug. 31, 2021 9 pages—Ex. 1066.
Sedra/Smith, "Microelectronic Circuits," Fourth Edition, Part 1 of 4, pp. 1-161—Ex. 1041, Ex. 1061, Ex. 1054.
Sedra/Smith, "Microelectronic Circuits," Fourth Edition, Part 2 of 4, pp. 162-1048 pages—Ex. 1041, Ex. 1061, Ex. 1054.
Sedra/Smith, "Microelectronic Circuits," Fourth Edition, Part 3 of 4, pp. 1049-1230 pages—Ex. 1041, Ex. 1061, Ex. 1054.
Sedra/Smith, "Microelectronic Circuits," Fourth Edition, Part 4 of 4, pp. 1231-1237 pages—Ex. 1041, Ex. 1061, Ex. 1054.
*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, 9 pages—Ex. 1066.
U.S. Pat. No. 10,517,149 ("the '149 Patent") Exemplary Infringement Contention Claim Charts, Appendix A-5 through I-3—Ex. 1067.
*Samsung Electronics Co., Ltd. et al.* v. *Lynk Labs, Inc.* Case No. 1:21-cv-02665, Notification of Docket Entry Jul. 27, 2021, 1 page—Ex. 1068.
*Samsung Electronics Co., Ltd. et al.* v. *Lynk Labs, Inc.* Case No. 1:21-cv-02665, Scheduling Order dated Aug. 19, 2021, 2 pages—Ex. 1069.
Civil Docket for Case# 6:21-cv-00097-ADA, Western District of Texas (Waco)—Lynk Labs, Inc. filed Jan. 29, 2001, 9 pages—Ex. 1074.
*Samsung Electronics Co., Ltd. et al.* v. *Lynk Labs, Inc.* Case No. 1:21-cv-02665, Notification of Docket Entry Oct. 18, 2021, 1 page—Ex. 1070.
*Samsung Electronics Co., Ltd. and Samsung Electronics America, Inc.*, v. *Lynk Labs, Inc.*, Case No. 1:21-cv-02665—Defendant Lynk Labs, Inc's Answer to Plaintiffs Samsung Electronics Co., Ltd. and Samsung Electronics America, Inc.'s First Amended Complaint and Counterclaims, filed Aug. 3, 2021, 67 pages—Ex. 1071.
*Lynk Labs, Inc.*, v. *Home Dept USA, Inc., The Home Depot Inc., and Home Depot Product Authority, LLC*, Case. No. 6:21-cv-00097, Complaint for Patent Infringement dated Jan. 29, 2021, 88 page—Ex. 1072.
*Lynk Labs, Inc.*, v. *Home Dept USA, Inc., The Home Depot Inc., and Home Depot Product Authority, LLC*, Case. No. 6:21-cv-00097-ADA, First Amended Complaint for Patent Infringement dated Mar. 17, 2021, 94 pages—Ex. 1073.
*Samsung Electronics Co., Ltd. and Samsung Electronics America, Inc.*, v. *Lynk Labs, Inc.*, Case No. 1:21-cv-02665—Supplemental Report of Parties' Planning Meeting, filed Oct. 14, 2021, 11 pages—Ex. 1075.
Tim Williams, The Circuit Designer's Companion, First Published 1991, ISBN 0 7506 1142 1, 314 pages—Ex. 1094.
*Home Depot U.S.A., Inc.*, v. *Lynk Labs, Inc.*, U.S. Pat. No. 10,932,341, Filing Date: Jan. 10, 2020, Issue Date: Feb. 23, 2021—PGR2022-00009; Declaration of Dr. Dean Neikirk U.S. Pat. No. 10,932,341, 140 pages—Ex. 1002.
*Home Depot U.S.A., Inc.*, v. *Lynk Labs, Inc.*, U.S. Pat. No. 10,932,341, Filing Date: Jan. 10, 2020, Issue Date: Feb. 23, 2021—PGR2022-00009; Petition for Post Grant Review of U.S. Pat. No. 10,932,341, 94 pages.
U.S. Appl. No. 16/740,295, filed Jan. 10, 2020 (Part 1) 768 pages—Ex. 1003.
U.S. Appl. No. 16/740,295, filed Jan. 10, 2020 (Part 2) 466 pages—Ex. 1003.
*Lynk Labs, Inc.*, v. *Home Depot USA, Inc., The Home Depot Inc., and Home Depot Product Authority, LLC*, Case No. 6:21-cv-00097, Complaint for Patent Infringement dated Jan. 29, 2021—Ex. 1011.
*Lynk Labs, Inc.*, v. *Home Depot USA, Inc., The Home Depot Inc., and Home Depot Product Authority, LLC*, Case No. 6:21-cv-00097-ADA, Plaintiff Lynk Labs, Inc.'s Amended Preliminary Infringement Contentions, dated Jun. 23, 2021, 241 pages—Ex. 1012.
*Lynk Labs, Inc.*, v. *Home Depot USA, Inc., The Home Depot Inc., and Home Depot Product Authority, LLC*, Case No. 6:21-cv-00097-ADA, Scheduling Order filed Aug. 13, 2021, 4 pages—Ex. 1013.
U.S. Appl. No. 61/217,215, filed May 28, 2009, 32 pages—Ex. 1014.
U.S. Appl. No. 60/997,771, filed Oct. 6, 2007, 24 pages—Ex. 1015.
*Lynk Labs, Inc.*, v. *Home Depot USA, Inc., The Home Depot Inc., and Home Depot Product Authority, LLC*, Case No. 6:21-cv-00097-ADA, Defendants' Opening Claim Construction Brief on the Terms of U.S. Pat. Nos. 10,091,842, 10,154,551, 10,349,479, 10,492,251, 10,517,149, 10,537,001, 10,652,979, 10,757,783, and 10,932,341 filed Oct. 6, 2021, 38 pages—Ex. 1021.
*Lynk Labs, Inc.*, v. *Home Depot USA, Inc., The Home Depot Inc., and Home Depot Product Authority, LLC*, Case No. 6:21-cv-00097-ADA, Plaintiff Lynk Labs, Inc.'s Responsive Claim Construction Brief filed Oct. 27, 2021, 47 pages—Ex. 1022.
Application Multi-Voltage and Multi-Brightness LED Lighting Devices and Methods of Using Same, Remarks filed Jun. 13, 2019 12 pages—Ex. 1023.
U.S. Appl. No. 15/369,218 Non-Final Office Action dated Oct. 2, 2018—Ex. 1024.
Response to Office Action U.S. Appl. No. 16/440,884, filed Aug. 22, 2019, 11 pages—Ex. 1026.
IEEE 100 The Authoritative Dictionary of IEEE Standards Terms Seventh Edition, Published by Standards Information Network IEEE Press, 3 pages—Ex. 1028.
Response to Office Action U.S. Appl. No. 16/440,884, filed Jun. 16, 2020, 8 pages—Ex. 1029.
*Home Depot USA, Inc.*, v. *Lynk Labs, Inc.*, Case PGR2022-00009, U.S. Pat. No. 10,932,341, Patent Owner's Mandatory Notices Pursuant to 37 C.F.R. Section 42.8 dated Nov. 19, 2021, 5 pages.
*Home Depot USA, Inc.*, v. *Lynk Labs, Inc.*, Case PGR2022-00009, U.S. Pat. No. 10,932,341, Issue Date Feb. 23, 2021, Petitioner's Power of Attorney dated Nov. 5, 2021, 2 pages.
*Home Depot U.S.A., Inc.*, v. *Lynk Labs, Inc.*, U.S. Pat. No. 10,932,341, Filing Date: Jan. 10, 2020, Issue Date: Feb. 23, 2021, IPR 2022-00143, Petition for Inter Partes Review of U.S. Pat. No. 10,932,341 dated Nov. 24, 2021, 81 pages.
*Home Depot USA, Inc.*, v. *Lynk Labs, Inc.* Case IPR2021-01540, U.S. Pat. No. 10,091,842—Declaration of Dr. Lebby; Issue Date Oct. 2, 2018—158 pages—Ex. 1002.
U.S. Appl. No. 15/334,029, filed Oct. 25, 2016—646 pages—Ex. 1003.

(56) References Cited

OTHER PUBLICATIONS

*Lynk Labs, Inc.* v. *Home Depot USA, Inc., The Home Depot Inc. and Home Depot Product Authority, LLC*, Case No. 6:21-cv-00097-ADA, Complaint for Patent Infringement filed Jan. 29, 2021—88 pages—Ex. 1004.
*Lynk Labs, Inc.* v. *Home Depot USA, Inc., The Home Depot Inc. and Home Depot Product Authority, LLC*, Case No. 6:21-cv-00097-ADA, Scheduling Order filed Aug. 13, 2021—4 pages—Ex. 1006.
Signalized Intersection Safety in Europe, Dec. 2003, Publication No. FHWA-PL-02-020, Office of International Programs; International @fhwa.dot.gov; www.international.fhwa.dot.gov—126 pages—Ex. 1010.
Ohno et al., "Traffic Light Queues with Departure Headway Depending Upon Positions," Kyoto University, J. Operations Research So. of Japan, vol. 17, No. 3, Sep. 1974—pp. 146-169—Ex. 1011.
U.S. Appl. No. 61/333,963, filed May 12, 2010—52 pages—Ex. 1021.
U.S. Appl. No. 61/284,927, filed Dec. 28, 2009—26 pages—Ex. 1022.
U.S. Appl. No. 61/335,069, filed Dec. 31, 2009—36 pages—Ex. 1023.
U.S. Appl. No. 60/997,771, filed Oct. 6, 2007—24 pages—Ex. 1024.
U.S. Appl. No. 60/547,653, filed Feb. 25, 2004—83 pages—Ex. 1025.
U.S. Appl. No. 60/559,867, filed Feb. 25, 2004—89 pages—Ex. 1026.
U.S. Appl. No. 61/217,215, filed May 28, 2009—32 pages—Ex. 1027.
U.S. Appl. No. 61/215,144, filed May 1, 2009—11 pages—Ex. 1028.
E. Fred Schubert, "Light Emitting Diodes," Rensselaer Polytechnic Institute, Cambridge University Press, 2002—327 page—Ex. 1030.
IEEE 100 The Authoritative Dictionary of IEEE Standards Terms, Seventh Edition—4 pages—Ex. 1032.
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 264 pages—Ex. 1005 (excerpts).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 100 pages—Ex. 1012 (Part 1).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 102 pages—Ex. 1012 (Part 2).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 102 pages—Ex. 1012 (Part 3).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 142 pages—Ex. 1012 (Part 4).
*Home Depot USA, Inc.*, v. *Lynk Labs, Inc.*, Case No. IPR2021-01540, U.S. Pat. No. 10,091,842, Petition for Inter Partes Review, Issue Date Oct. 2, 2018—74 pages.
*Home Depot USA, Inc.*, v. *Lynk Labs, Inc.*, Case No. IPR2021-01540, U.S. Pat. No. 10,091,842, Notice of Filing Date Accorded to Petition and Time for Filing Patent Owner Preliminary Response—mailed Oct. 15, 2021—6 pages.
*Home Depot USA, Inc.*, v. *Lynk Labs, Inc.*, Case No. IPR2021-01540, U.S. Pat. No. 10,091,842, Petitioner's Power of Attorney, Issue Date Oct. 2, 2018—2 pages.
*Home Depot USA, Inc.*, v. *Lynk Labs, Inc.*, Case No. IPR2021-01540, U.S. Pat. No. 10,091,842, Patent Owner's Mandatory Notices Pursuant to 37 C.F.R. Section 42.8 filed Oct. 22, 2021—6 pages.
*Home Depot USA, Inc.*, v. *Lynk Labs, Inc.*, Case No. IPR2021-01541, U.S. Pat. No. 10,537,001, Declaration of Dr. Dena Neikirk, Filing Date Feb. 12, 2019, Issue Date Jan. 14, 2020.
U.S. Appl. No. 16/274,164, filed Feb. 12, 2019—543 pages—Ex. 1003.
*Lynk Labs, Inc.*, v. *Home Depot USA, Inc., The Home Depot Inc., and Home Depot Product Authority, LLC*, Case No. 6:21-cv-00097, Complaint for Patent Infringement Case dated Jan. 29, 2021—88 pages—Ex. 1011.
*Lynk Labs, Inc.*, v. *Home Depot USA, Inc., The Home Depot Inc., and Home Depot Product Authority, LLC*, Case No. 6:21-cv-00097-ADA, Defendants' Opening Claim Construction Brief on the Terms of U.S. Pat. Nos. 10,091,842, 10,154,551, 10,349,479, 10,492,251, 10,517,149, 10,537,001, 10,562,979, 10,757,783, and 10,932,341 filed Oct. 6, 2021—38 pages—Ex. 1019.
Response to Final Office Action U.S. Appl. No. 15/369,218, filed Jun. 13, 2018, 10 pages—Ex. 1020.
Non-Final Office Action U.S. Appl. No. 156/369,218 dated Oct. 2, 2018, 11 pages—Ex. 1021.
Non-Final Office Action U.S. Appl. No. 16/440,884 dated Jul. 23, 2019, 10 pages—Ex. 1023.
Continuation U.S. Appl. No. 16/369,218—original claims—Ex. 1024.
Response to Office Action U.S. Appl. No. 16/440,884, 11 pages—Ex. 1026.
*Home Depot USA, Inc.*, v. *Lynk Labs, Inc.*, Case No. IPR2021-01541, Filing Date Feb. 12, 2019, Issue Date Jan. 14, 2020, Petition for Inter Partes Review of U.S. Pat. No. 10,537,001 Under 35 U.S.C. Section 311-319 and 37 C.F.R. Section 42.1-100, ET SEQ., 82 pages.
*Home Depot USA, Inc.*, v. *Lynk Labs, Inc.*, Case No. IPR2021-01541, U.S. Pat. No. 10,537,001, Petitioner's Power of Attorney, Issue Date Jan. 14, 2020—2 pages.
*Home Depot USA, Inc.*, v. *Lynk Labs, Inc.*, Case No. IPR2021-01541, U.S. Pat. No. 10,537,001, Patent Owner's Mandatory Notices Pursuant to 37 C.F.R. Section 42.8 filed Nov. 10, 2021—6 pages.
*Samsung Electronics Co., Ltd.* v. *Lynk Labs, Inc.* U.S. Pat. No. 10,750,583, Petition for Inter Partes Review of U.S. Pat. No. 10,750,583 dated Oct. 28, 2021—79 pages.
*Samsung Electronics Co., Ltd.*, v. *Lynk Labs, Inc.* U.S. Pat. No. 10,750,583, Power of Attorney for Petitioner Samsung Electronics Co., Ltd.,—3 pages.
*Samsung Electronics Co., Ltd.*, v. *Lynk Labs, Inc.* U.S. Pat. No. 10,750,583, Petitioner's Notice Regarding Multiple Petitions—8 pages.
*Samsung Electronics Co., Ltd.*, v. *Lynk Labs, Inc.* Case: IPR2022-00100, U.S. Pat. No. 10,750,583, Patent Owner's Mandatory Notices Pursuant to 37 C.F.R Section 42.8—5 pages.
*Samsung Electronics Co., Ltd.*, v. *Lynk Labs, Inc.* U.S. Pat. No. 10,750,583, Declaration of R. Jacob Baker, Ph.D., P.E. in Support of Petition for Inter Partes Review of U.S. Pat. No. 10,750,583 Ex. 1002.
Baker CV, 37 pages—Ex. 1003.
U.S. Appl. No. 16/449,273, filed Jun. 21, 2019 Ex. 1004.
Sedra/Smith, "Microelectronic Circuits," Fourth Edition, Parts 1-4, pp.—Exs. 1041, 1061, 1054, 1034.
Watson Mastering Electronics, Third Edition, pp. 1-151—Exs. 1012, 1018, 1031.
Tim Williams, The Circuit Designer's Companion, First Published 1991, ISBN 0 7506 1142 1, 314 pages—Ex. 1042, 1094.
Chamber Dictionary of Science and Technology, General Editor Professor Peter MB Walker, CBE, FRSE, Chambers Harrap Published Ltd. 1999 ISBN 0 550 14110 3, 4 pages—Ex. 1047, 1024.
McGraw-Hill Dictionary of Scientific and Technical Terms, Sixth Edition, Library of Congress Cataloging in Publication Data , ISBN 0-07-042313-X, pp. 4—Ex. 1048, 1018.
U.S. Appl. No. 61/333,963, filed May 12, 2010 Ex. 1063.
U.S. Appl. No. 61/284,927, filed Dec. 28, 2009 Ex. 1064.
U.S. Appl. No. 61/335,069, filed Dec. 31, 2009 Ex. 1065.
U.S. Appl. No. 60/997,771, filed Oct. 6, 2007 Ex. 1066.
U.S. Appl. No. 60/547,653, filed Mar. 2, 2004 Ex. 1067.
U.S. Appl. No. 60/559,867, filed Apr. 8, 2004 Ex. 1068.
U.S. Appl. No. 61/217,215, filed May 28, 2009 Ex. 1069.

(56) References Cited

OTHER PUBLICATIONS

U.S. Appl. No. 61/215,144, filed May 1, 2009 Ex. 1070.
"Supplemental Report of Parties' Planning Meeting", from *Samsung Electronics Co. Ltd. et al* v. *Lynk Labs, Inc.*, Case No. 1:21-cv-02665, filed Oct. 14, 2021—11 pages Ex. 1075, Ex. 1080.
Docket from *Samsung Electronics Co. Ltd. et al* v. *Lynk Labs, Inc.*, Case No. 1:21-cv-02665 printed Oct. 25, 2021—14 pages Ex. 1076, Ex. 1061.
Estimated Patent Case Schedule in Northern District of Illinois—2 pages Ex. 1079, Ex. 1062.
"Defendant Lynk Labs, Inc.'s Answer to Plaintiffs Samsung Electronics Co., Ltd. and Samsung Electronics America, Inc.'s First Amended Complaint and Counterclaims" from *Samsung Electronics Co. Ltd. et al* v. *Lynk Labs, Inc.*, Case No. 1:21-cv-02665, filed Aug. 3, 2021—67 pages Ex. 1082, Ex. 1071.
"Defendant Lynk Labs, Inc.'s Amended Preliminary Infringement Contentions" from *Samsung Electronics Co. Ltd. et al* v. *Lynk Labs, Inc.*, Case No. 1:21-cv-02665, filed Aug. 31, 2021—9 pages Ex. 1083, Ex. 1066.
U.S. Pat. No. 10,750,583 Exemplary Infringement Chart Samsung SmartThings Hub (as Appendix J-2)—11 pages Ex. 1084.
"Notification of Docket Entry" from *Samsung Electronics Co. Ltd. et al* v. *Lynk Labs, Inc.*, Case No. 1:21-cv-02665, filed Jul. 27, 2021—1 page Ex. 1085, Ex. 1068.
"Order" as scheduling order from *Samsung Electronics Co. Ltd. et al* v. *Lynk Labs, Inc.*, Case No. 1:21-cv-02665, filed Aug. 19, 2021—2 pages Ex. 1086.
"Notification of Docket Entry" from *Samsung Electronics Co. Ltd. et al* v. *Lynk Labs, Inc.*, Case No. 1:21-cv-02665, filed Oct. 18, 2021—1 page Ex. 1087, Ex. 1070.
"Defendant Lynk Labs, Inc.'s Supplement to Second Amended Preliminary Infringement Contentions ('551 Patent and 979 Patent)" from *Samsung Electronics Co. Ltd. et al* v. *Lynk Labs, Inc.*, Case No. 1:21-cv-02665, filed Sep. 22, 2021—20 pages Ex. 1072.
U.S. Pat. No. 10,091,842 ("'842 Patent")—Exhibit G-01 Bruning.
U.S. Pat. No. 10,091,842 ("'842 Patent")—Exhibit G-02 Ohishi '319.
U.S. Pat. No. 10,091,842 ("'842 Patent")—Exhibit G-03 Ruxton.
U.S. Pat. No. 10,091,842 ("'842 Patent")—Exhibit G-04 Walding.
U.S. Pat. No. 10,091,842 ("'842 Patent")—Exhibit G-05 Bohn.
U.S. Pat. No. 10,091,842 ("'842 Patent")—Exhibit G-06 Dowling.
U.S. Pat. No. 10,537,001 ("'001 Patent")—Exhibit H-01 Dowling.
U.S. Pat. No. 10,537,001 ("'001 Patent")—Exhibit H-02 Lys '321.
U.S. Pat. No. 10,537,001 ("'001 Patent")—Exhibit H-03 Miskin.
U.S. Pat. No. 10,537,001 ("'001 Patent")—Exhibit H-04 Leong '003.
U.S. Pat. No. 10,537,001 ("'001 Patent")—Exhibit H-05 Konno.
U.S. Pat. No. 10,932,341 ("'341 Patent")—Exhibit I-01 Ohishi '009.
U.S. Pat. No. 10,932,341 ("'341 Patent")—Exhibit I-02 Muthu '558.
U.S. Pat. No. 10,932,341 ("'341 Patent")—Exhibit I-03 Dowling.
U.S. Pat. No. 10,932,341 ("'341 Patent")—Exhibit I-04 Konno.
U.S. Pat. No. 10,932,341 ("'341 Patent")—Exhibit I-05 Leong '003.
U.S. Pat. No. 10,932,341 ("'341 Patent")—Exhibit I-06 Reymond.
"White Light Emitting Diode Development for General Illumination Applications" to James Ibbetson, published on May 1, 2006 ("Ibbetson").
*Samsung Electronics Co., Ltd.* v. *Lynk Labs, Inc.* Patent Owner—U.S. Pat. No. 10,154,551 Petition for Inter Partes Review of U.S. Pat. No. 10,154,551—90 pages.
*Samsung Electronics Co., Ltd.* v. *Lynk Labs, Inc.* Patent Owner—U.S. Pat. No. 10,154,551 Power of Attorney for Petitioner Samsung Electronics, Co., Ltd. U.S. Pat. No. 10,154,551—3 pages.
*Samsung Electronics Co., Ltd.* v. *Lynk Labs, Inc.* Patent Owner—U.S. Pat. No. 10,652,979 Petition for Inter Partes Review of U.S. Pat. No. 10,652,979—84 pages.
*Samsung Electronics Co., Ltd.* v. *Lynk Labs, Inc.* Patent Owner—U.S. Pat. No. 10,652,979 Power of Attorney for Petitioner Samsung Electronics, Co., Ltd. U.S. Pat. No. 10,652,979—3 pages.
*Samsung Electronics Co., Ltd.* v. *Lynk Labs, Inc.* Patent Owner—U.S. Pat. No. 10,154,551 Declaration of R. Jacob Baker, Ph.D., P.E. in support of Petition for Inter Partes Review of U.S. Pat. No. 10,154,551—175 pages—Ex. 1002.
R. Jacob (Jake) Baker, Ph.D., P.E. CV—36 pages, U.S. Pat. Nos. '252, '298, '466, '551, '674, '697, '979—Ex-1003.
File History U.S. Pat. No. 10,154,551 U.S. Appl. No. 15/797,806 dated Oct. 30, 2017—Ex. 1004.
Williams, Tim, "The Circuit Designer's Companion," 2021, 314 pages—(Parts 1 and 2), '551 Ex. 1013.
Chambers, Dictionary of Science and Technology, published Chambers Harrap Publishers Ltd 1999, 8 pages, '551—Ex. 1024.
*Samsung Electronics Co. Ltd. and Samsung Electronics America, Inc.* v. *Lynk Labs, Inc.* Defendant Lynk Labs, Inc.'s Supplement to Second Amended Preliminary Infringement Contentions ('551 Patent and '979 Patent), Case No. 1:21-cv-02665, filed Sep. 22, 2021, 14 pages—Ex. 1072.
*Lynk Labs, Inc.* v. *Samsung Electronics Co. Ltd. and Samsung Electronics America, Inc.* Case No. 6:21-cv-00526 Complaint for Patent Infringement filed May 25, 2021, '551 12 pages—Ex. 1074.
*Lynk Labs, Inc.* v. *Samsung Electronics Co. Ltd. and Samsung Electronics America, Inc.* Case No. 6:21-cv-00526 First Amended Complaint for Patent Infringement filed Jun. 9, 2021, 18 pages—Ex. 1075.
*Samsung Electronics Co. Ltd. and Samsung Electronics America, Inc.* v. *Lynk Labs, Inc.* Samsung Electronics Co., Ltd. and Samsung Electronics America, Inc,'s Second Amended Complaint for Declaratory Judgment of Non-Infringement, Case No. 1:21-cv-02665, filed Sep. 8, 2021, 44 pages—Ex. 1076.
*Samsung Electronics Co. Ltd. et al.* v. *Lynk Labs, Inc.* Civil Docket for Case #1:21-cv-02665 dated Sep. 27, 2021 '551 12 pages—Ex. 1077.
*Lynk Labs, Inc.* v. *Samsung Electronics Co. Ltd. et al.* Civil Docket for Case #6:21-cv-00526-ADA dated Sep. 27, 2021 '551 8 pages—Ex. 1078.
*Lynk Labs, Inc.* v. *Samsung Electronics Co. Ltd. et al.* Civil Docket for Case #1:21-cv-05126 dated Sep. 29, 2021 '551 8 pages—Ex. 1079.
*Lynk Labs, Inc.* v. *Samsung Electronics Co. Ltd. et al.* Case No. 6:21-cv-00526-ADS Order Granting Plaintiff Lynk Labs, Inc.'s Stipulation to Transfer '551 2 pages—Ex. 1080.
*Samsung Electronics Co., Ltd.* v. *Lynk Labs, Inc.* Patent Owner—U.S. Pat. No. 10,652,979 Declaration of R. Jacob Baker, Ph.D., P.E. in support of Petition for Inter Partes Review of U.S. Pat. No. 10,652,979—174 pages—Ex. 1002.
McGraw-Hill Dictionary of Scientific and Technical Term, Sixth Edition, '979—9 pages—Ex. 1018.
Declaration of R. Jacob Baker. Ph.D., P.E. U.S. Pat. No. 10,154,551, Inter Partes Review of U.S. Pat. No. 10,154,551, 176 pages—Ex 1002.
*Samsung Electronics Co., Ltd.* v. *Lynk Labs, Inc.* U.S. Pat. No. 10,492,251 Petition for Inter Partes Review of U.S. Pat. No. 10,492,251, 95 pages.
*Samsung Electronics Co., Ltd.* v. *Lynk Labs, Inc.* U.S. Pat. No. 10,492,251 Power of Attorney for Petitioner Samsung Electronics Co., Ltd. 3 pages.
*Samsung Electronics Co., Ltd.* v. *Lynk Labs, Inc.* U.S. Pat. No. 10,492,251 Petitioner's Notice Regarding Multiple Petitions, 9 pages.
*Samsung Electronics Co., Ltd.* v. *Lynk Labs, Inc.* Case: IPR2022-00051, U.S. Pat. No. 10,492,251 Patent Owner's Mandatory Notices Pursuant to 37 C.F.R. Section 42.8, 5 pages.
*Samsung Electronics Co., Ltd.* v. *Lynk Labs, Inc.*, U.S. Pat. No. 10,492,251 Declaration of R. Jacob Baker, Ph.D., P.E. in Support of Petition for Inter Partes Review of U.S. Pat. No. 10,492,251, 173 pages—Ex. 1002.
U.S. Appl. No. 16/148,945, filed Feb. 15, 2019, 309 pages—Ex. 1004.
U.S. Appl. No. 61/331,225, filed May 4, 2010, 63 pages—Ex. 1010.

(56) References Cited

OTHER PUBLICATIONS

Watson Mastering Electronics, Third Edition, pp. 1-151—Ex. 1012 and Ex. 1018.
Stan Gibilisco, Handbook of Radio & Wireless Technology, pp. 1-188—Ex. 1013.
Defendant Lynk Labs, Inc.'s Response to Plaintiffs' Initial Non-Infringement, Unenforceability, and Invalidity Contentions, 51 pages—Ex. 1038.
File History for U.S. Pat. No. 9,198,237 Issued May 18, 2011—Part 2, 321 pages—Ex. 1039.
Tim Williams, The Circuit Designer's Companion, First Published 1991, ISBN 0 7506 1142 1, 314 pages—Ex. 1042, Ex. 1094.
Chamber Dictionary of Science and Technology, General Editor Professor Peter MB Walker, CBE, FRSE, Chambers Harrap Published Ltd. 1999 ISBN 0 550 14110 3, 4 pages—Ex. 1047, Ex. 1024.
McGraw-Hill Dictionary of Scientific and Technical Terms, Sixth Edition, Library of Congress Cataloging in Publication Data , ISBN 0-07-042313-X, pp. 4—Ex. 1048, Ex. 1018.
PCT File History US/2011/36359, filed May 12, 2011—Ex. 1050.
PCT File History US/2010/62235, filed Dec. 28, 2010—Ex. 1052, Ex. 1039.
U.S. Provisional Application filed May 12, 2010—Ex. 1063.
U.S. Provisional Application filed Dec. 28, 2009—Ex. 1064.
U.S. Provisional Application filed Dec. 31, 2009—Ex. 1065.
U.S. Appl. No. 60/547,653, filed Feb. 25, 2004—Ex. 1067.
U.S. Appl. No. 60/559,867, filed Feb. 25, 2004—Ex. 1068.
Civil Docket for Case# 6:21-cv-02665, Northern District of Illinois, Samsung Electronics. Co., Ltd., filed May 17, 2021, 14 pages—Ex. 1076, Ex. 1061.
Civil Docket for Case# 6:21-cv-00097-ADA, Western District of Texas (Waco)—Lynk Labs, Inc. filed Jan. 29, 2001, 9 pages—Ex. 1077, Ex. 1074.
US District Court for the Northern District of Illinois, Estimated Patent Case Schedule, 2 pages—Ex. 1079, Ex. 1062.
*Samsung Electronics Co., Ltd. and Samsung Electronics America, Inc.*, v. *Lynk Labs, Inc.*, Case No. 1:21-cv-02665—Supplemental Report of Parties' Planning Meeting, filed Oct. 14, 2021, 11 pages—Ex. 1080, Ex. 1075.
*Samsung Electronics Co., Ltd. and Samsung Electronics America, Inc.*, v. *Lynk Labs, Inc.*, Case No. 1:21-cv-02665—Defendant Lynk Labs, Inc's Answer to Plaintiffs Samsung Electronics Co., Ltd. and Samsung Electronics America, Inc.'s First Amended Complaint and Counterclaims, filed Aug. 3, 2021, 67 pages—Ex. 1082, Ex. 1071.
*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, 9 pages—Ex. 1083, Ex. 1066.
U.S. Pat. No. 10,492,251 ("the '251 Patent") Exemplary Infringement Contention Claim Charts, Appendix A-1 through J-1—Ex. 1084.
*Samsung Electronics Co., Ltd. et al.* v. *Lynk Labs, Inc.* Case No. 1:21-cv-02665, Notification of Docket Entry Jul. 27, 2021, 1 page—Ex. 1085, Ex. 1068.
*Samsung Electronics Co., Ltd., and Samsung Electronics America, Inc.* v. *Lynk Labs, Inc.*, No. 21 C 2665, Order dated Aug. 19, 2021—Ex. 1086.
*Samsung Electronics Co., Ltd. et al.* v. *Lynk Labs, Inc.* Case No. 1:21-cv-02665, Notification of Docket Entry Oct. 18, 2021, 1 page—Ex. 1087, Ex. 1070.
*Lynk Labs, Inc.*, v. *Home Dept USA, Inc., The Home Depot Inc., and Home Depot Product Authority, LLC*, Case. No. 6:21-cv-00097, Complaint for Patent Infringement dated Jan. 29, 2021, 88 page—Ex. 1088, Ex. 1072.
*Lynk Labs, Inc.*, v. *Home Dept USA, Inc., The Home Depot Inc., and Home Depot Product Authority, LLC*, Case. No. 6:21-cv-00097-ADA, First Amended Complaint for Patent Infringement dated Mar. 17, 2021, 94 pages—Ex. 1089, Ex. 1073.
*Samsung Electronics Co., Ltd. et al.* v. *Lynk Labs, Inc.* Case IPR2022-00051, U.S. Pat. No. 10,492,251 Notice of Filing Date Accorded to Petition, mailed Dec. 9, 2021, 5 pages.
Petition for Inter Partes Review, *Home Depot USA, Inc.*, Petitioner, v. *Lynk Labs, Inc.*, Patent Owner, Case IPR2021-001367 U.S. Pat. No. 10,154,551, Issue Date Dec. 11, 2018, Title: "AC Light Emitting Diode and AC LED Drive Methods and Apparatus," 93 pages dated Aug. 18, 2021.
Petitioners' Power of Attorney, *Home Depot USA, Inc.*, Petitioner, v. *Lynk Labs, Inc.*, Patent Owner, Case IPR2021-001367 U.S. Pat. No. 10,154,551, Issue Date Dec. 11, 2018, Title: "AC Light Emitting Diode and AC LED Drive Methods and Apparatus," 2 pages dated Aug. 17, 2021.
Declaration of Dr. Dean Neikirk—U.S. Pat. No. 10,154,551, Claims 1, 3, 4, 5, 7, 8—141 pages—Ex 1002.
U.S. Appl. No. 15/797,806—Now U.S. Pat. No. 10,154,551—Ex 1003.
U.S. Appl. No. 11/066,414—Now U.S. Pat. No. 7,489,086 issued Feb. 10, 2009—Ex 1005.
IEEE 100, The Authoritative Dictionary of IEEE Standards Terms—Seventh Edition, 3 pages—Ex 1010.
Complaint for Patent Infringement *Lynk Labs, Inc.* Plaintiff v. *Home Depot USA, Inc., The Home Depot Inc., and Home Depot Product Authority, LLC* Defendants, Case No. 6:21-cv-00097, filed Jan. 20, 2021—Ex. 1011.
Azazi et al., "Review of Passive and Active Circuits for Power Factor Correction in Single Phase, Low Power AC-DC Converters," Proceedings of the 14th International Middle East Power Systems Conference (MEPCON'10) Cairo University, Egypt, Dec. 19-21, 2010, Paper ID 154, 8 pages—Ex 1016.
U.S. Appl. No. 60/547,653, filed Feb. 25, 2004—Ex 1017.
U.S. Appl. No. 60/559,867, filed Feb. 25, 2004—Ex 1018.
U.S. Appl. No. 60/997,771, filed Oct. 6, 2007—Ex 1019.
U.S. Appl. No. 61/215,144, filed May 1, 2009—Ex 1022.
U.S. Appl. No. 61/217,215, filed May 28, 2009—Ex 1023.
U.S. Appl. No. 61/284,927, filed Dec. 28, 2009—Ex 1024.
U.S. Appl. No. 61/335,069, filed Dec. 31, 2009—Ex 1025.
U.S. Appl. No. 61/333,963, filed May 12, 2010—Ex 1026.
Plaintiff Lynk Labs, Inc.'s Amended Preliminary Infringement Contentions, Case No. 6:21-cv-00097-ADA filed Jun. 23, 2021, 7 pages—Ex 1034.
U.S. Appl. No. 60/379,079, filed May 9, 2002—Ex 1035.
U.S. Appl. No. 60/391,627, filed Jun. 26, 2002—Ex 1036.
Institute of Transportation Engineers Publication No. ST-017B, 1997 ISBN: 0-935403-16-7, ITE Specification (183369415.1), Chapter 2 Vehicle Traffic Control Signal Heads, 25 pages—Ex 1038.
Osorno, "Fourier Analysis of a Single-Phase Full Bridge Rectifier Using Matlab," California State University Northridge, 2002-774, 9 pages—Ex 1039.
Scheduling Order *Lynk Labs, Inc.* Plaintiff v. *Home Depot USA, Inc., The Home Depot Inc., and Home Depot Product Authority, LLC* Defendants, Case No. 6:21-cv-00097, filed Aug. 13, 2021—Ex. 1040.
Vachak et al., "Power Factor Correction Circuits: Active Filters," International Journal of Engineering Research and General Science, vol. 2, Issue 5, Aug.-Sep. 2014, ISSAN 2091-2730, 9 pages—Ex 1041.
*Samsung Electronics Co., Ltd. and Samsung Electronics America, Inc.* v. *Lynk Labs, Inc.*, Case No. 1:21-cv-02665, Samsung's Final Unenforcebility and Invalidity Contentions, dated Apr. 1, 2022—52 pages.
Petition for Inter Partes Review, *Home Depot USA, Inc.*, Petitioner, v. *Lynk Labs, Inc.*, Patent Owner, Case IPR2021-01370 U.S. Pat. No. 10,349,479, Issue Date Jul. 9, 2019, Title: "Color Temperature Controlled and Low THD LED Lighting Devices and Systems and Methods of Driving the Same," 52 pages dated Aug. 18, 2021.
Petitioners' Power of Attorney, *Home Depot USA, Inc.*, Petitioner, v. *Lynk Labs, Inc.*, Patent Owner, Case IPR2021-01370 U.S. Pat. No. 10,349,479, Issue Date Jul. 9, 2019, Title: "Color Temperature Controlled and Low THD LED Lighting Devices and Systems and Methods of Driving the Same," 2 pages dated Aug. 17, 2021.
Declaration of Dr. Dean Neikirk U.S. Pat. No. 10,349,479, Inter Partes Review No. IPR2021-01370, 98 pages—Ex 1002.
U.S. Appl. No. 15/369,218, filed Dec. 5, 2016, 617 pages—Ex 1003.
U.S. Appl. No. 61/630,025, filed Dec. 2, 2011, 39 pages—Ex 1011.
U.S. Appl. No. 61/570,200, filed Dec. 13, 2011, 51 pages—Ex 1012.

(56) References Cited

OTHER PUBLICATIONS

Complaint for Patent Infringement, Case No. 6:21-cv-00097, *Lynk Labs, Inc.* v. *Home Depot USA, Inc., The Home Depot Inc., and Home Depot Product Authority, LLC*, dated Jan. 29, 2021, 88 pages—Ex 1014.
Plaintiff Amended Preliminary Infringement Contentions, Lynk Lab's, Inc.'s, Case No. 6:21-cv-00097-ADA, *Lynk Labs, Inc.* v. *Home Depot USA, Inc., The Home Depot Inc., and Home Depot Product Authority, LLC*, dated Jun. 23, 2021, 7 pages—Ex 1015.
Scheduling Order, Case No. 6:21-cv-00097-ADA, *Lynk Labs, Inc.* v. *Home Depot USA, Inc., The Home Depot Inc., and Home Depot Product Authority, LLC*, filed Aug. 13, 2021, 4 pages—Ex 1016.
*Home Depot U.S.A., Inc.* v. *Lynk Labs, Inc.* Case IPR 2022-00023 U.S. Pat. No. 10,517,149, Issue Date Dec. 24, 2019, Declaration of Dr. Lebby dated Oct. 20, 2021, 157 pages—Ex. 1002.
*Lynk Labs, Inc.*, v. *Home Depot USA, Inc., The Home Dept Inc., and Home Depot Product Authority, LLC* Case No. 6:21-cv-00097-ADA Scheduling Order filed Aug. 13, 2021, 4 pages—Ex. 1003.
*Lynk Labs, Inc.*, v. *Home Depot USA, Inc., The Home Dept Inc., and Home Depot Product Authority, LLC* Case No. 6:21-cv-00097 Complaint for Patent Infringement dated Jan. 29, 2021, 88 pages—Ex. 1004.
*Lynk Labs, Inc.* v. *Home Depot USA, Inc., The Home Dept Inc., and Home Depot Product Authority, LLC* Case No. 6:21-cv-00097-ADA Plaintiff Lynk Labs, Inc,'s Amended Preliminary Infringement Contentions '149 Patent dated Jun. 23, 2021, 154 pages—Ex. 1005.
U.S. Appl. No. 16/215,502, filed Dec. 10, 2018, 359 pages—Ex. 1006.
IEEE 100 The Authoritative Dictionary of IEEE Standards Terms, Seventh Edition, Published by Standards Informaiton Network IEEE Press, pp. 1-4—Ex. 1007.
*Lynk Labs, Inc.* v. *Home Depot USA, Inc., The Home Dept Inc., and Home Depot Product Authority, LLC* Case No. 6:21-cv-00097-ADA Defendants' Opening Claim Construction Brief on the Terms of U.S. Pat. Nos. 10,091,842, 10,154,551, 10,349,479, 10,492,251, 10,517,149, 10,537,001, 10,652,979, 10,757,783 and 10,932,341 filed Oct. 6, 2021, 38 pages—Ex. 1015.
U.S. Appl. No. 16/274,164, filed Feb. 12, 2019, 543 pages—Ex. 1016.
Heat Sink, Merriam-Webster; Examples of heat sink in a sentence, http://wwwmerriam-webster.com/dictionary/heat%20sink, 7 pages—Ex. 1017.
Insulator, Britannica Online Encylopedia Full Article, http://www.britannica.com/print/article/289459, 2 pages—Ex. 1018.
*Home Depot USA, Inc.*, v. *Lynk Labs, Inc.* Case IPR2022-00023 U.S. Pat. No. 10,517,149 Issue Date Dec. 24, 2019, Petition for Inter Partes Review dated Oct. 20, 2021, 74 pages.
*Home Depot USA, Inc.*, v. *Lynk Labs, Inc.* Case IPR2022-00023 U.S. Pat. No. 10,517,149 Issue Date Dec. 24, 2019, Petitioner's Power of Attorney dated Oct. 20, 2021, 2 pages.
*Home Depot USA, Inc.*, v. *Lynk Labs, Inc.* Case IPR2022-00023 U.S. Pat. No. 10,517,149 Issue Date Dec. 24, 2019, Patent Owner's Mandatory Notices Pursuant to 37 C.F.R. Section 42.8 dated Nov. 10, 2021, 5 pages.
U.S. Pat. No. 10,966,298 ('298 Patent)—Exhibit H-06—Mac Powerbook G3.
U.S. Pat. No. 10,966,298 ('298 Patent)—Exhibit H-07—iPod G3.
U.S. Pat. No. 10,966,298 ('298 Patent)—Exhibit H-08—iPAQ H5500.
U.S. Pat. No. 11,019,697 ('697 Patent)—Exhibit I-01—Piepgrass.
U.S. Pat. No. 11,019,697 ('697 Patent)—Exhibit I-02—Hitachi.
U.S. Pat. No. 11,019,697 ('697 Patent)—Exhibit 1-03—Mueller.
U.S. Pat. No. 11,019,697 ('697 Patent)—Exhibit I-04—NEC.
U.S. Pat. No. 11,019,697 ('697 Patent)—Exhibit I-05—Miskin '299.
U.S. Pat. No. 11,019,697 ('697 Patent)—Exhibit I-06—Mac Powerbook G3.
U.S. Pat. No. 11,019,697 ('697 Patent)—Exhibit I-07—iPod G3.
U.S. Pat. No. 11,019,697 ('697 Patent)—Exhibit I-08—iPAQ H5500.
Macintosh PowerBook G3, 1999.
Apple iPod Third Generation User's Guide, released Apr. 29, 2003.
"HP iPAQ Pocket PC H5500," GadgetSpeak, published Nov. 6, 2003.
Light-Emitting Diodes by E. Fred Schubert, published in 2003 ("Schubert").
Fundamentals of LED Drivers by A. Hernandez et al., published in 2003 ("Hernandez").
Color System by Kinetics iColor MR Data Sheet.
WDS Wireless Dimming System Operator's Manual published in 2003 ("WDS-Manual").
AND8137/D—High Current LED—Isolated Low Voltage AC Drive—Application Note by Carl Walding, published in Oct. 2003 ("AND8137/D").
Characteristics of high-efficient InGaN-based white LED lighting by Yuji Uchida, published in 2011 ("Uchida").
*Samsung Electronics Co. Ltd. and Samsung Electronics America, Inc.* v. *Lynk Labs, Inc.* Case No. 1:21-cv-02665, Samsung's Initial Non-Infringement, Unenforceability, and Invalidity Contentions dated Sep. 21, 2021—85 pages.
U.S. Pat. No. 10,492,251 ('251 Patent)—Exhibit A-01—Lys '262.
U.S. Pat. No. 10,492,251 ('251 Patent)—Exhibit A-02—KR '747.
U.S. Pat. No. 10,492,251 ('251 Patent)—Exhibit A-03—KR '215.
U.S. Pat. No. 10,492,251 ('251 Patent)—Exhibit A-04—iColor System.
U.S. Pat. No. 10,492,251 ('251 Patent)—Exhibit A-05—Miskin '299.
U.S. Pat. No. 10,492,252 ('252 Patent)—Exhibit B-01—Piepgrass.
U.S. Pat. No. 10,492,252 ('252 Patent)—Exhibit B-02—Hitachi.
U.S. Pat. No. 10,492,252 ('252 Patent)—Exhibit B-03—Mueller.
U.S. Pat. No. 10,492,252 ('252 Patent)—Exhibit B-04—NEC.
U.S. Pat. No. 10,492,252 ('252 Patent)—Exhibit B-05—Miskin '299.
U.S. Pat. No. 10,492,252 ('252 Patent)—Exhibit B-06—Mac Powerbook G3.
U.S. Pat. No. 10,492,252 ('252 Patent)—Exhibit B-07—iPod G3.
U.S. Pat. No. 10,492,252 ('252 Patent)—Exhibit B-08—iPAQ H5500.
U.S. Pat. No. 10,499,466 ('466 Patent)—Exhibit C-01—Piepgrass.
U.S. Pat. No. 10,499,466 ('466 Patent)—Exhibit C-02—Hitachi.
U.S. Pat. No. 10,499,466 ('466 Patent)—Exhibit C-03—Mueller.
U.S. Pat. No. 10,499,466 ('466 Patent)—Exhibit C-04—NEC.
U.S. Pat. No. 10,499,466 ('466 Patent)—Exhibit C-05—Miskin '299.
U.S. Pat. No. 10,499,466 ('466 Patent)—Exhibit C-06—Mac Powerbook G3.
U.S. Pat. No. 10,499,466 ('466 Patent)—Exhibit C-07—iPod G3.
U.S. Pat. No. 10,499,466 ('466 Patent)—Exhibit C-08—iPAQ H5500.
U.S. Pat. No. 10,506,674 ('674 Patent)—Exhibit D-01—Piepgrass.
U.S. Pat. No. 10,506,674 ('674 Patent)—Exhibit D-02—Hitachi.
U.S. Pat. No. 10,506,674 ('674 Patent)—Exhibit D-03—Mueller.
U.S. Pat. No. 10,506,674 ('674 Patent)—Exhibit D-04—NEC.
U.S. Pat. No. 10,506,674 ('674 Patent)—Exhibit D-05—Miskin '299.
U.S. Pat. No. 10,506,674 ('674 Patent)—Exhibit D-06—Mac Powerbook G3.
U.S. Pat. No. 10,506,674 ('674 Patent)—Exhibit D-07—iPod G3.
U.S. Pat. No. 10,506,674 ('674 Patent)—Exhibit D-08—iPAQ H5500.
U.S. Pat. No. 10,517,149 ('149 Patent)—Exhibit E-01—Lys '626.
U.S. Pat. No. 10,517,149 ('149 Patent)—Exhibit E-02—KR '747.
U.S. Pat. No. 10,517,149 ('149 Patent)—Exhibit E-03—KR '215.
U.S. Pat. No. 10,517,149 ('149 Patent)—Exhibit E-04—iColor System.
U.S. Pat. No. 10,517,149 ('149 Patent)—Exhibit E-05—Miskin '299.
U.S. Pat. No. 10,687,400 ('400 Patent)—Exhibit F-01—Lys '626.
U.S. Pat. No. 10,687,400 ('400 Patent)—Exhibit F-02—KR '747.
U.S. Pat. No. 10,687,400 ('400 Patent)—Exhibit F-03—CK LEDs.
U.S. Pat. No. 10,687,400 ('400 Patent)—Exhibit F-04—Miskin '299.
U.S. Pat. No. 10,750,583 ('583 Patent)—Exhibit G-01—Lys '626.
U.S. Pat. No. 10,750,583 ('583 Patent)—Exhibit G-02—KR 747.
U.S. Pat. No. 10,750,583 ('583 Patent)—Exhibit G-03—KR 215.

(56) References Cited

OTHER PUBLICATIONS

U.S. Pat. No. 10,750,583 ('583 Patent)—Exhibit G-04—iColor System.
U.S. Pat. No. 10,750,583 ('583 Patent)—Exhibit G-05—Piepgrass.
U.S. Pat. No. 10,750,583 ('583 Patent)—Exhibit G-06—Miskin '299.
U.S. Pat. No. 10,966,298 ('298 Patent)—Exhibit H-01—Piepgrass.
U.S. Pat. No. 10,966,298 ('298 Patent)—Exhibit H-02—Hitachi.
U.S. Pat. No. 10,966,298 ('298 Patent)—Exhibit H-03—Mueller.
U.S. Pat. No. 10,966,298 ('298 Patent)—Exhibit H-04—NEC.
U.S. Pat. No. 10,966,298 ('298 Patent)—Exhibit H-05—Miskin '299.
*Samsung Electronics Co., Ltd.* v. *Lynk Labs, Inc.* U.S. Pat. No. 10,687,400, Declaration of R. Jacob Baker Ph.D., P.E. in Support of Petition for Inter Partes Review of U.S. Pat. No. 10,687,400 dated Nov. 5, 2021—177 pages Ex. 1002.
File History of U.S. Pat. No. 10,687,400 Parts 1-4 1181 pages Ex. 1004.
Watson Mastering Electronics, Third Edition, pp. 1-151—Ex. 1030, Ex. 1012, Ex. 1018, Ex. 1031.
Sedra/Smith, "Microelectronic Circuits," Fourth Edition, Parts 1-4, 515 pages Ex. 1034, Ex. 1041, Ex. 1061, Ex. 1054.
Docket from *Samsung Electronics Co., Ltd. et al* v. *Lynk Labs, Inc.* No. 1:21-cv-02665 printed Nov. 5, 2021—14 pages Ex. 1076.
"Defendant Lynk Labs, Inc.'s Preliminary Infringement Contentions" from *Samsung Electronics Co. Ltd. et al* v. *Lynk Labs, Inc.*, Case No. 1:21-cv-02665 filed Jul. 21, 2021—9 pages Ex. 1080.
U.S. Pat. No. 10,687,400 ("the '400 Patent") Exemplary Infringement Chart ACOM Round (US) as Appendix K-1—9 pages Exs. 1081, 1084.
"Order" from *Samsung Electronics Co. Ltd. et al* v. *Lynk Labs, Inc.*, Case No. 1:21-cv-02665, filed Aug. 19, 2021—2 pages Ex. 1086.
"Supplemental Report of Parties' Planning Meeting" from *Samsung Electronics Co. Ltd. et al* v. *Lynk Labs, Inc.*, Case No. 1:21-cv-02665, filed Oct. 14, 2021—11 pages Ex. 1087, Ex. 1075, Ex. 1080.
"Order" from *Samsung Electronics Co. Ltd. et al* v. *Lynk Labs, Inc.*, Case No. 1:21-cv-02665, filed Oct. 18, 2021—1 page Ex. 1088.
Tim Williams, The Circuit Designer's Companion, First Published 1991, ISBN 0 7506 1142 1, 314 pages—Ex. 1089, Ex. 1094.
*Samsung Electronics Co., Ltd.* v. *Lynk Labs, Inc.* U.S. Pat. No. 10,687,400, Petition for Inter Partes Review of U.S. Pat. No. 10,687,400 dated Nov. 12, 2021—96 pages.
*Samsung Electronics Co., Ltd.* v. *Lynk Labs, Inc.* U.S. Pat. No. 10,687,400, Power of Attorney for Petitioner Samsung Electronics Co., Ltd. dated Oct. 8, 2021—3 pages.
*Samsung Electronics Co., Ltd.* v. *Lynk Labs, Inc.* U.S. Pat. No. 10,687,400, Petitioner's Notice Regarding Multiple Petitions dated Nov. 12, 2021—9 pages.
*Samsung Electronics Co., Ltd.* v. *Lynk Labs, Inc.* U.S. Pat. No. 10,687,400, Patent Owner's Mandatory Notices Pursuant to 37 C.F.R. § 42.8 dated Nov. 19, 2021—5 pages.
Petition for Inter Partes Review, *Home Depot USA, Inc.*, Petitioner, v. *Lynk Labs, Inc.*, Patent Owner, Case IPR2021-001368 U.S. Pat. No. 10,757,783, Issue Date Aug. 25, 2020, Title: "Color Temperature Controlled and Low THD LED Lighting Devices and Driving the Same," 95 pages dated Aug. 18, 2021.
Petitioners' Power of Attorney, *Home Depot USA, Inc.*, Petitioner, v. *Lynk Labs, Inc.*, Patent Owner, Case IPR2021-001368 U.S. Pat. No. 10,757,783, Issue Date Aug. 25, 2020, Title: "Color Temperature Controlled and Low THD LED Lighting Devices and Driving the Same," 2 pages dated Aug. 17, 2021.
Declaration of Dr. Lebby U.S. Pat. No. 10,757,783 dated Aug. 18, 2021, 187 pages—Ex 1002.
U.S. Appl. No. 16/440,884, filed Jun. 13, 2019, 341 pages—Ex 1003.
Institute of Transportation Engineers, Publication No. ST-017B 300/IG/102, ISBN 0-935403-16-7 (1998), 25 pages—Ex 1007.
Complaint for Patent Infringement *Lynk Labs, Inc.* v. *Home Depot USA Inc., The Home Depot Inc., and Home Depot Product Authority, LLC*, Case No. 6:21-cv-00097, filed Jan. 29, 2021, 86 pages—Ex. 1010.
U.S. Appl. No. 61/630,025, filed Dec. 2, 2011, 39 pages—Ex 1012.
U.S. Appl. No. 61/570,200, filed Dec. 13, 2011, 51 pages—Ex 1013.
Plaintiff Lynk Labs, Inc.'s Amended Preliminary Infringement Contentions, Case No. 6:21-cv-00097-ADA, dated Jun. 23, 2021, 7 pages—Ex 1019.
Okon et al., "The First Practical LED", 14 pages—Ex 1020.
Scheduling Order, Case No. 6:21-cv-00097-ADA filed Aug. 13, 2021, 4 pages—Ex 1021.
U.S. Appl. No. 61/233,829, filed Aug. 14, 2009, 36 pages—Ex 1022.
Written Opinion and International Search Report for International App. No. PCT/IS2012/067623, 18 pages.
M. Rico-Secades, et al., "Driver for high efficiency LED based on flyback stage with current mode control for emergency lighting system," Industry Applications Conference, Oct. 2004, pp. 1655-1659.
Robert W. Erickson & Dragen Maksimovic, "Fundamentals of Power Electronics" (Kluwer Academic Publishers, 2nd ed.), p. 576.
Master Thesis of Srinivasa M. Baddela titled "High Frequency AC Operation of LEDs to Resolve the Current Sharing Problem When Connected in Parallel."
Srinivasa M. Baddela and Donald S. Zinger, "Parallel Connected LEDs Operated at High Frequency to Improve Current Sharing," IAS 2004, pp. 1677-1681.
Citizen Electronics Co., Ltd.'s datasheet for CL-820-U1N CITILEDs dated Aug. 6, 2007.
Fairchild Semiconductor Corporation's "Surface Mount LED Lamp Super Bright 0805" datasheet dated Aug. 30, 2001.
U.S. Appl. No. 61/333,963, filed May 12, 2010, 52 pages—IPR2021-01299 Ex 1036; IPR2021-10347 Ex 1055' IPR2021-01346 Ex 1036, IPR2021-01345 Ex 1037; IPR2021-01300 Ex 1036.
U.S. Appl. No. 61/284,927, filed Dec. 28, 2009, 54 pages—IPR2021-01299 Ex 1037; IPR2021-10347 Ex 1056; IPR2021-01346 Ex 1037, IPR2021-01345 Ex 1037; IPR2021-01300 Ex 1037.
U.S. Appl. No. 61/335,069, filed Dec. 31, 2009, 65 pages—IPR2021-01299 Ex 1038; IPR2021-10347 Ex 1057; IPR2021-01346 Ex 1038, IPR2021-01345 Ex 1038, IPR2021-01300 Ex 1038.
U.S. Appl. No. 60/997,771, filed Oct. 6, 2007, 26 pages—IPR2021-01299 Ex 1039; IPR2021-10347 Ex 1058; IPR2021-01346 Ex 1039, IPR2021-01345 Ex 1039; IPR2021-01300 Ex 1039.
U.S. Appl. No. 60/547,653, filed Feb. 25, 2004, 84 pages—IPR2021-01299 Ex 1040; IPR2021-10347 Ex 1059; IPR2021-01346 Ex 1040, IPR2021-01345 Ex 1040; IPR2021-01300 Ex 1040.
U.S. Appl. No. 60/559,867, filed Feb. 25, 2004, 90 pages—IPR2021-01299 Ex 1041; IPR2021-10347 Ex 1060; IPR2021-01346 Ex 1041, IPR2021-01345 Ex 1041; IPR2021-01300 Ex 1041.
U.S. Appl. No. 61/217,215, filed May 28, 2008, 47 pages—IPR2021-01299 Ex 1042; IPR2021-10347 Ex 1061; IPR2021-01346 Ex 1042, IPR2021-01345 Ex 1042; IPR2021-01300 Ex 1042.
U.S. Appl. No. 61/215,144, filed May 1, 2009, 11 pages—IPR2021-01299 Ex 1043; IPR2021-10347 Ex 1062; IPR2021-01346 Ex 1043, IPR2021-01345 Ex 1043; IPR2021-01300 Ex 1043.
Watson, John, Mastering Electonics, Third Ed., McGraw Hill Inc., published in 1990—IPR2021-01299 Ex 1080; IPR2021-10347 Ex 1026; IPR2021-01346 Ex 1062; IPR2021-01345 Ex 1060; IPR2021-01300 Ex 1006.
Sedra, A., et al., Microelectronic Circuits, Fourth Ed., Oxford University Press, published in 1998—IPR2021-01299 Ex 1081; IPR2021-10347 Ex 1027; IPR2021-01346 Ex 1063; IPR2021-01345 Ex 1061 (4 parts); IPR2021-01300 Ex 1007.
Compaq Comp. Corp. et al., Universal Serial Bus Specification Revision 2.0 published in 2000, 650 pages—IPR2021-01299 Ex 1091; IPR2021-10347 Ex 1095; IPR2021-01346 Ex 1069; IPR2021-01345 Ex 1072; IPR2021-01300 Ex 1055.
Declaration of R. Jacob Baker. Ph.D., P.E. U.S. Pat. No. 10,966,298, Inter Partes Review No. IPR2021-01347, 152 pages—Ex 1002.
Gilbisco, Stan, Handbook of Radio & Wireless Technology, published in 1999, 188 pages, McGraw-Hill—IPR2021-10347 Ex 1013.

(56) References Cited

OTHER PUBLICATIONS

Petition for Inter Partes Review, *Samsung Electronics Co., Ltd.*, Petitioner, v. *Lynk Labs, Inc*., Patent Owner, Case IPR2021-01347 U.S. Pat. No. 10,966,298, Issue Date Dec. 3, 2019, Title: "AC Light Emitting Diode and AC LED Drive Methods and Apparatus," 70 pages dated Sep. 7, 2021.
Petition for Inter Partes Review, *Samsung Electronics Co., Ltd.*, Petitioner, v. *Lynk Labs, Inc*., Patent Owner, Case IPR2021-01346 U.S. Pat. No. 10,499,466, Issue Date Dec. 10, 2019, Title: "AC Light Emitting Diode and AC LED Drive Methods and Apparatus," 70 pages dated Sep. 7, 2021.
Petition for Inter Partes Review, *Samsung Electronics Co., Ltd.*, Petitioner, v. *Lynk Labs, Inc*., Patent Owner, Case IPR2021-01345 U.S. Pat. No. 10,492,252, Issue Date Nov. 26, 2019, Title: "AC Light Emitting Diode and AC LED Drive Methods and Apparatus," 65 pages dated Sep. 7, 2021.
Petition for Inter Partes Review, *Samsung Electronics Co., Ltd.*, Petitioner, v. *Lynk Labs, Inc*., Patent Owner, Case IPR2021-01300 U.S. Pat. No. 11,019,697, Issue Date May 25, 2019, Title: "AC Light Emitting Diode and AC LED Drive Methods and Apparatus," 71 pages dated Sep. 7, 2021.
Petition for Inter Partes Review, *Samsung Electronics Co., Ltd.*, Petitioner, v. *Lynk Labs, Inc*., Patent Owner, Case IPR2021-01299 U.S. Pat. No. 10,506,674, Issue Date Dec. 10, 2019, Title: "AC Light Emitting Diode and AC LED Drive Methods and Apparatus," 70 pages dated Sep. 7, 2021.
Plaintiff's First Amended Complaint for Patent Infringement, Case No. 6:21-cv-00526-ADA, *Lynk Labs, Inc.* v. *Samsung ElectronicsCo., Ltd. and Samsung Electronics America, Inc*. dated Jun. 9, 2021, 18 pages—IPR2021-01346 Ex 1080, IPR2021-01345 Ex 1056; IPR2021-01300 Ex 1086.
Defendant's Preliminary Infringement Contentions, Case No. 1:21-cv-2655, *Samsung Electronics Co., Ltd. and Samsung Electronics America, Inc.* v. *Lynk Labs, Inc*., dated Jul. 21, 2021, 9 pages—IPR2021-01346 Ex 1081, IPR2021-01345 Ex 1057, IPR2021-01300 Ex 1080.
Defendant's Answer and Counterclaims, Case No. 1:21-cv-2665, *Samsung Electronics Co., Ltd. and Samsung Electronics America, Inc.* v. *Lynk Labs, Inc*., dated Aug. 3, 2021, 67 pages—IPR2021-01346 Ex 1083, IPR2021-01345 Ex 1077, IPR2021-01300 Ex 1082.
Defendant's Amended Preliminary Infringement Contentions, Case No. 1:21-cv-2665, *Samsung Electronics Co., Ltd. and Samsung Electronics America, Inc.* v. *Lynk Labs, Inc*., dated Aug. 31, 2021, 9 pages—IPR2021-01346 Ex 1086; IPR2021-01345 Ex 1086; IPR2021-01300 Ex 1087.
Scheduling Order, Case No. 1:21-cv-2665, *Samsung Electronics Co., Ltd. and Samsung Electronics America, Inc.* v. *Lynk Labs, Inc*., dated Aug. 19, 2021—IPR2021-01346 Ex 1085, IPR2021-01345 Ex 1085, IPR2021-01300 Ex 1084.
Notification of Docket Entry, Case No. 1:21-cv-2665, *Samsung Electronics Co., Ltd. and Samsung Electronics America, Inc.* v. *Lynk Labs, Inc*., dated Jul. 27, 2021, 1 page—IPR2021-01346 Ex 1084, IPR2021-01345 Ex 1084, IPR2021-01300 Ex 1083.
Declaration of R. Jacob Baker. Ph.D., P.E. U.S. Pat. No. 10,499,466, 187 pages, Inter Partes Review No. IPR2021-01346—Ex 1002.
Declaration of R. Jacob Baker. Ph.D., P.E. U.S. Pat. No. 10,492,252, 148 pages, Inter Partes Review No. IPR2021-01345—Ex 1002.
Declaration of R. Jacob Baker. Ph.D., P.E. U.S. Pat. No. 11,019,697, 261 pages, Inter Partes Review No. IPR2021-01300—Ex 1002.
Declaration of R. Jacob Baker. Ph.D., P.E. U.S. Pat. No. 10,506,674, 172 pages, Inter Partes Review No. IPR2021-01299—Ex 1002.
Declaration of R. Jacob Baker. Ph.D., P.E. U.S. Pat. No. 10,999,298, 152 pages, Inter Partes Review No. IPR2021-01347—Ex 1002.
Plaintiff's Complaint, Case No. 1:21-cv-2665, *Lynk Labs, Inc.* v. *Samsung Electronics Co., Ltd. and Samsung Electronics America, Inc*., dated May 25, 2021, 12 pages—IPR2021-01300 Ex 1074.
Plaintiff's First Amended Complaint, Case No. 1:21-cv-2665, *Samsung Electronics Co., Ltd. and Samsung Electronics America, Inc.* v. *Lynk Labs, Inc*., dated May 25, 2021, 33 pages—IPR2021-01300 Ex 1075.
Plaintiff's Complaint, Case No. 1:21-cv-2665, *Samsung Electronics Co., Ltd. and Samsung Electronics America, Inc.* v. *Lynk Labs, Inc*., dated May 17, 2021, 30 pages—IPR2021-01300 Ex 1076.
The Microarchitecture of the Pentium 4 Processor by Hinton et al., published in 2001, 13 pages—IPR2021-01300 Ex 1017.
Wireless Medium Access Control (MAC) and Physical Layer (PHY) Specifications for Wireless Personal Area Networks (WPANs) by IEEE Computer Society, 1018 IEEE 812.15.1, published in 2002, 1168 pages—IPR2021-01300 Ex 1018.
*Samsung Electronics Co., Ltd.*, v. *Lynk Labs, Inc*. Patent Owner—Power of Attorney for Petitioner Samsung Electronics Co., Ltd. U.S. Pat. No. 10,492,252, dated Jul. 21, 2021—3 pages.
*Samsung Electronics Co., Ltd.*, v. *Lynk Labs, Inc*., Case IPR2021-01345 , U.S. Pat. No. 10,492,252—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc*., Case IPR2021-01345 , U.S. Pat. No. 10,492,252—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc*. Patent Owner—Power of Attorney for Petitioner Samsung Electronics Co., Ltd. U.S. Pat. No. 10,966,298 dated Jul. 21, 2021—3 pages.
*Samsung Electronics Co., Ltd.*, v. *Lynk Labs, Inc*., Case IPR2021-01347, U.S. Pat. No. 10,966,298—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc*., Case IPR2021-01347 , U.S. Pat. No. 10,966,298—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc*. Patent Owner—Power of Attorney for Petitioner Samsung Electronics Co., Ltd. U.S. Pat. No. 10,499,466 dated Jul. 21, 2021—3 pages.
*Samsung Electronics Co., Ltd.*, v. *Lynk Labs, Inc*., Case IPR2021-01346, U.S. Pat. No. 10,499,466—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc*., Case IPR2021-01346 , U.S. Pat. No. 10,499,466—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc*. Patent Owner—Power of Attorney for Petitioner Samsung Electronics Co., Ltd. U.S. Pat. No. 11,019,697 dated Jul. 21, 2021—3 pages.
*Samsung Electronics Co., Ltd.*, v. *Lynk Labs, Inc*., Case IPR2021-01300, U.S. Pat. No. 11,019,697—Notice of Filing Date Accorded to Petition and Time for Filing Patent Owner Preliminary Response filed Sep. 7, 2021—6 pages.
*Samsung Electronics Co., Ltd.*, v. *Lynk Labs, Inc*., Case IPR2021-01300 , U.S. Pat. No. 11,019,697—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc*., Case IPR2021-01300 , U.S. Pat. No. 11,019,697—Petitioner's Response to Notice of Filing Date Accorded to Petition and Time for Filing Patent Owner Preliminary Response (Paper No. 3) dated Sep. 20, 2021—3 pages.
*Samsung Electronics Co., Ltd.*, v. *Lynk Labs, Inc*., Case IPR2021-01300 , U.S. Pa. No. 11,019,697—Notice of Accepting Corrected Petition filed Sep. 20, 2021—2 pages.
*Samsung Electronics Co., Ltd.*, v. *Lynk Labs, Inc*. Patent Owner—Power of Attorney for Petitioner Samsung Electronics Co., Ltd. U.S. Pat. No. 10,506,674 dated Jul. 21, 2021—3 pages.
*Samsung Electronics Co., Ltd.*, v. *Lynk Labs, Inc*., Case IPR2021-01299, U.S. Pat. No. 10,506,674—Notice of Filing Date Accorded to Petition and Time for Filing Patent Owner Preliminary Response filed Sep. 7, 2021—6 pages.
*Lynk Labs, Inc.* v. *Home Depot USA, Inc. The Home Depot, Inc., and Home Depot Product Authority, LLC*, Case No. 6:21-cv-00097-ADA, Defendants' Corrected Reply Claim Construction Brief on the Terms of U.S. Pat. Nos. 10,091,842, 10,154,551, 10,349,479,

(56) References Cited

OTHER PUBLICATIONS 10,492,251,10,517,149, 10,537,001, 10,652,979, 10,757,783, and 10,932,341 filed Nov. 10, 2021—60 pages.
*Lynk Labs, Inc.* v. *Home Depot USA, Inc. The Home Depot, Inc., and Home Depot Product Authority, LLC*, Case No. 6:21-cv-00097-ADA, Plaintiff Lynk Labs, Inc.'s Responsive Claim Construction Brief filed Oct. 27, 2021, Part 1.
*Lynk Labs, Inc.* v. *Home Depot USA, Inc. The Home Depot, Inc., and Home Depot Product Authority, LLC*, Case No. 6:21-cv-00097-ADA, Plaintiff Lynk Labs, Inc.'s Responsive Claim Construction Brief filed Oct. 27, 2021, Part 2.
Declaration of Dr. Dean Neikirk U.S. Pat. No. 11,297,705 PGR2023-00016—*Home Depot U.S.A., Inc.* v. *Lynk Labs, Inc.*—Part 1 87 Pages—Ex. 1002.
Declaration of Dr. Dean Neikirk U.S. Pat. No. 11,297,705 PGR2023-00016—*Home Depot U.S.A., Inc.* v. *Lynk Labs, Inc.*—Part 2 89 Pages—Ex. 1002.
IEEE 100 The Authoritative Dictionary of IEEE Standards Terms; Seventh Edition—PGR2023-00016 Home Depot 3 pages—Ex. 1028.
*Home Depot U.S.A., Inc.*, v. *Lynk Labs, Inc.* IPR2021-01370 U.S. Pat. No. 10,349,479 B2 Decision, Final Written Decision Determining All Challenged Claims Unpatentable 35U.S.C. Section 318 (a) entered Jan. 18, 2023.
*Home Depot U.S.A., Inc.*, v. *Lynk Labs, Inc.* U.S. Pat. No. 11,297,705 Filing Date Feb. 22, 2021 Issue Date Apr. 5, 2022—PGR2023-00016, Petition for Post-Grant Review of U.S. Pat. No. 11,297,705 dated Jan. 5, 2023—Part 1.
*Home Depot U.S.A., Inc.*, v. *Lynk Labs, Inc.* U.S. Pat. No. 11,297,705 Filing Date Feb. 22, 2021 Issue Date Apr. 5, 2022—PGR2023-00016, Petition for Post-Grant Review of U.S. Pat. No. 11,297,705 dated Jan. 5, 2023—Part 2.
*Home Depot U.S.A., Inc.*, v. *Lynk Labs, Inc.* IPR2021-01367 U.S. Pat. No. 10,154,551 B2 Judgment, Final Written Decision Determining All Challenged Claims Unpatentable 35U.S.C. Section 318 (a) entered Feb. 14, 2023—30 pages.
*Home Depot U.S.A., Inc.*, v. *Lynk Labs, Inc.* IPR2021-01368 U.S. Pat. No. 10,757,783 B2 Decision, Final Written Decision Determining All Challenged Claims Unpatentable 35U.S.C. Section 318 (a) entered Jan. 27, 2023—36 pages.
*Home Depot U.S.A., Inc.*, v. *Lynk Labs, Inc.* IPR2021-01369 U.S. Pat. No. 10,492,251 B2 Judgment, Final Written Decision Determining All Challenged Claims Unpatentable 35U.S.C. Section 318 (a) entered Feb. 14, 2023—36 pages.
Petition for Inter Partes Review, *Home Depot USA, Inc.*, Petitioner, v. *Lynk Labs, Inc.*, Patent Owner, Case IPR2021-01369 U.S. Pat. No. 10,492,251, Issue Date Nov. 26, 2019, Title: "AC Light Emitting Diode and AC LED Drive Methods and Apparatus," 53 pages dated Aug. 18, 2021.
Petitioners' Power of Attorney, *Home Depot USA, Inc.*, Petitioner, v. *Lynk Labs, Inc.*, Patent Owner, Case IPR2021-01369 U.S. Pat. No. 10,492,251, Issue Date Nov. 26, 2019, Title: "AC Light Emitting Diode and AC LED Drive Methods and Apparatus," 53 pages dated Aug. 17, 2021.
Declaration of Dr. Lebby U.S. Pat. No. 10,492,251dated Aug. 18, 2021, 134 pages—Ex 1002.
U.S. Appl. No. 16/148,945, filed Oct. 1, 2018—Ex. 1003.
Complaint for Patent Infringement, *Lynk Labs, Inc.* v. *Home Depot USA, Inc., The Home Depot Inc., and Home Depot Product Authority, LLC*, Case No. 6:21-cv-00097 dated Jan. 29, 2021, 88 pages—Ex. 1010.
Plaintiff Lynk Labs, Inc.'s Amended Preliminary Infringement Contentions, *Lynk Labs, Inc.* v. *Home Depot USA, Inc., The Home Depot Inc., and Home Depot Product Authority, LLC*, Case No. 6:21-cv-00097-ADA, dated Jun. 23, 2021, 7 pages—Ex. 1011.
Scheduling Order, *Lynk Labs, Inc.* v. *Home Depot USA, Inc., The Home Depot Inc., and Home Depot Product Authority, LLC*, Case No. 6:21-cv-00097-ADA, filed Aug. 13, 2021, 4 pages—Ex. 1012.

* cited by examiner

COLOR TEMPERATURE CONTROLLED AND LOW THD LED LIGHTING DEVICES AND SYSTEMS AND METHODS OF DRIVING THE SAME

PRIORITY CLAIM

The present application is a continuation of U.S. patent application Ser. No. 17/001,074, filed Aug. 24, 2020, which is a continuation of U.S. patent application Ser. No. 16/440,884, filed Jun. 13, 2019, which is a continuation of U.S. patent application Ser. No. 15/369,218, filed Dec. 5, 2016, which is a continuation of U.S. patent application Ser. No. 15/005,108, filed Jan. 25, 2016, which is a continuation of U.S. patent application Ser. No. 14/362,173, filed Jun. 2, 2014, which is a national phase of PCT Application No. PCT/US2012/067623, filed Dec. 3, 2012, which claims priority to U.S. Provisional Application No. 61/630,025, filed Dec. 2, 2011, U.S. Provisional Application No. 61/570,200, filed Dec. 13, 2011, and is a continuation-in-part of PCT Application No. PCT/US2012/051531 filed Aug. 20, 2012—the contents of all of which are expressly incorporated herein by reference.

TECHNICAL FIELD

The present invention generally relates to light emitting diode ("LED") circuits for use with AC voltage sources. More specifically, the present invention relates to LED devices capable of having color temperature control, low total harmonic distortion, and methods of driving the same. This document discloses technology relating to architecture for high power factor and low harmonic distortion of LED lighting systems. Related examples may be found in previously-filed disclosures that have common inventorship with this disclosure. Various embodiments relate generally to lighting systems that include light emitting diodes (LEDs).

FEDERALLY SPONSORED RESEARCH OR DEVELOPMENT

None.

BACKGROUND OF THE INVENTION

LEDs are semiconductor devices that produce light when a current is supplied to them. LEDs are intrinsically DC devices that only pass current in one polarity, and historically have been driven by constant current or constant voltage DC power supplies. When driven by these DC power supplies, LEDs are typically provided in a series string, in parallel strings or in series parallel configurations based on the drive method and LED lighting system design.

Recent advancements in the field of lighting have led to the use of LED circuits which are capable of using AC power to drive LEDs configured in particular devices and/or circuit arrangements such that some of the LEDs may operate during the positive phase of the AC power cycle, some LEDs may operate during the negative phase of the AC power cycle, and, in some cases, some or all LEDs may operate during both the positive and negative phases of the AC power cycle. LEDs powered with AC power typically last substantially longer than traditional halogen and incandescent devices or lamps, and typically require much less power to produce a substantially similar amount of light. However, LEDs powered by AC power sources act as a non-linear load. As a result of the non-linearity, LEDs powered using AC power sources may have a lower power factor, and may have a greater total harmonic distortion, than existing halogen or incandescent lighting devices. Having a low power factor and increased distortion may result in higher energy costs, transmission losses, and/or damage to electrical equipment. While the amount of power needed to drive an LED lighting device may be less than to drive a halogen or incandescent lighting device producing a substantially similar amount of light, the overall cost of operating an LED lighting device using AC power may be equal to or more than the amount required to drive the halogen or incandescent lighting device using the same AC power source.

Another advantage that traditional halogen and incandescent lighting devices have over present LED lighting devices driven with AC power is that halogen and incandescent lighting devises have the ability to change color temperature when the voltage provided to them is changed. Light in halogen and incandescent lighting devices are typically generated by a hot wire filament. As the power provided to the bulb is decreased, the temperature of the filament typically decreases, causing the color temperature of the emitted light to move down the color spectrum and make the light appear warmer, i.e. closer to yellow or amber or red than white or blue. In order to achieve this effect in LED lighting devices driven with AC power, complicated and expensive drive schemes are currently required which drive up the cost of the lighting device and the cost to operate the same. One example would be color mixing with red, green and blue LEDs referred to as "RGB" which typically uses pulse width modulation to create any color of light desired. However, the power supplies for this are very complex and larger in size. Other complex versions of constant current or constant voltage DC with only two different LED colors can also be used, however these power supplies can also be large and complex. These drive schemes may also be inefficient and waste additional power or electricity, further increasing operating costs.

Therefore, it would be advantageous to design a circuit, device, or system utilizing LEDs that maximizes power factor while reducing the total harmonic distortion resulting from driving the circuit, device or system using AC power.

It would also be advantageous to design a circuit, device, or system where the color temperature of the LEDs driven with AC power may be dynamically adjusted using simple control methods without having to utilize any complicated or expensive drive mechanisms.

Power factor is important to utilities who deliver electrical power to customers. For two loads that require the same level of real power, the load with the better power factor actually demands less current from the utility. A load with a 1.0 power factor requires the minimum amount of current from the utility. Utilities may offer a reduced rate to customers with high power factor loads.

A poor power factor may be due to a phase difference between voltage and current. Power factor can also be degraded by distortion and harmonic content of the current. In some cases, distorted current waveforms tend to increase the harmonic energy content, and reduce the energy at the fundamental frequency. For a sinusoidal voltage waveform, only the energy at the fundamental frequency may transfer real power to a load. Distorted current waveforms can result from non-linear loads such as rectifier loads. Rectifier loads may include, for example, diodes such as LEDs, for example.

LEDs are widely used device capable of illumination when supplied with current. For example, a single red LED may provide a visible indication of operating state (e.g., on or off) to an equipment operator. As another example, LEDs can be used to display information in some electronics based devices, such as handheld calculators. LEDs have also been used, for example, in lighting systems, data communications and motor controls.

Typically, an LED is formed as a semiconductor diode having an anode and a cathode. In theory, an ideal diode will only conduct current in one direction. When sufficient forward bias voltage is applied between the anode and cathode, conventional current flows through the diode. Forward current flow through an LED may cause photons to recombine with holes to release energy in the form of light.

The emitted light from some LEDs is in the visible wavelength spectrum. By proper selection of semiconductor materials, individual LEDs can be constructed to emit certain colors (e.g., wavelength), such as red, blue, or green, for example.

In general, an LED may be created on a conventional semiconductor die. An individual LED may be integrated with other circuitry on the same die, or packaged as a discrete single component. Typically, the package that contains the LED semiconductor element will include a transparent window to permit the light to escape from the package.

The present invention is provided to solve these and other issues.

SUMMARY OF THE INVENTION

Accordingly, the present invention is provided to increase the performance of LED lighting devices driven by AC power. The LED lighting devices of the present invention seek to provide one or more of a color temperature controllable AC LED lighting device and/or an AC LED lighting device having an increased power factor and reduced total harmonic distortion.

According to one aspect of the invention, an LED lighting device having at least two LED circuits connected in parallel, each of the at least two LED circuits having one or more LEDs is provided. Each of the at least two LED circuits that are connected in parallel have a different forward operating voltage than the other LED circuit(s) within the device, and, each of the at least two LED circuits are capable of emitting light having one or more of a different color or wavelength than the other LED circuit(s) within the device. The device further includes at least one active current limiting device connected in series with at least one LED in at least one of the at least two LED circuits. The device and/or circuits are configured such that each LED circuit is capable of emitting light during both a positive and a negative phase of a provided AC voltage when the LED lighting device is connected to an AC voltage source.

According to another aspect of the invention, the at least one current limiting device may be, for example, a current limiting diode or a constant current regulator.

According to another aspect of the invention, each of the LED circuits and the at least one active current limiting device are integrated onto a single substrate to form the device.

According to another aspect of the invention, the device may include additional active current limiting devices, which may also be integrated on the single substrate. Each LED circuit in the device may be connected in series to at least one active current limiting device. Where each LED circuit is connected in series to at least one active current limiting device, each circuit may be connected to its own current limiting device which may each allow a similar or different amount of current to flow through each circuit, or multiple circuits may be connected to at least one common current limiting device which acts to limit the current for each of the circuits.

According to another aspect of the invention, the LED lighting device may include a bridge rectifier having at least one of the at least two LED circuits connected across the output of the bridge rectifier.

According to another aspect of the invention, at least one of the at least two circuits may include two or more LEDs connected in an anti-parallel configuration.

According to another aspect of the invention, at least one of the at least two circuits may include at least five diodes, at least four of the diodes being LEDs. The at least four LEDs may be connected in a bridge rectifier configuration and the at least fifth diode may be connected across the output of the bridge rectifier. The at least fifth diode connected across the output of the bridge rectifier may be a standard diode, an LED or a constant current diode, or may alternatively a constant current regulator.

According to another aspect of the invention, at least one of the at least two circuits may include seven or more diodes, at least six of the diodes being LEDs. The at least six LEDs being connected in an imbalanced bridge rectifier configuration, with the at least seventh diode being connected across the output of the imbalanced bridge rectifier. The at least seventh diode connected across the output of the bridge rectifier may be a standard diode, an LED or a constant current diode, or may alternatively a constant current regulator.

According to another aspect of the invention, the light emitted by the one or more LEDs forming at least one of the at least two LED circuits may be one or more of a different color or wavelength than the light emitted by the one or more LEDs of the other connected LED circuit(s) in the device. Using different colored of LEDs in each circuit will allow each circuit to emit different colors of light to contribute to the overall color temperature of light emitted by the device.

According to another aspect of the invention, each of the at least two circuits may be coated in phosphor, each of the at least two circuits having a different phosphor coating than the other connected at least two LED circuits. The different phosphor coating on each of the at least two circuits may cause each circuit to emit one or more of a different color or wavelength of light than the other connected LED circuits.

According to another aspect of the invention, the LED lighting device may be integrated into a lighting system, the lighting system having a dimmer switch capable of providing AC voltage to the LED lighting device, i.e. the dimmer switch be a connected AC power source or supply. The dimmer switch may be used to control the AC voltage provided to the at least two LED circuits to control the light output of each circuit to control a color temperature of light emitted by the LED lighting device.

According to one aspect of the invention, a method of controlling color temperature of light emitted by an LED lighting device is provided. In order to control the color temperature of the light emitted by the device, at least two LED circuits are connected in parallel. Each connected LED circuit has a different forward operating voltage and is capable of emitting light of one or more of a different color or wavelength than the other LED circuits connected in parallel. The current provided to at least one of the at least two LED circuits is limited, and at least one of the provided voltage and current to control the light output of the LED circuits connected in parallel is adjusted. The voltage and current provided to each circuit may be a direct AC voltage and current or a rectified AC voltage or current, with the possibility that some circuits in the device are provided a direct AC voltage and current and some of the circuits in the device are provided with a rectified AC voltage and current.

According to one aspect of the invention, an LED lighting device is provided. The LED lighting device may include at least one LED circuit having two or more LEDs connected in series, and at least one active current limiting device, the active current limiting device being connected in parallel with the at least one LED in the at least one LED circuit.

According to another aspect of the invention, the LED lighting device may include at least a second active current limiting device, the second active current limiting device being connected in series with the at least one LED circuit.

According to another aspect of the invention, the LED lighting device may further include a bridge rectifier, wherein the at least one LED circuit is connected across the output of the bridge rectifier. The bridge rectifier may be constructed using either standard diodes, LEDs or some combination thereof.

According to another aspect of the invention, the LED lighting device may include at least one additional LED circuit having two or more LEDs connected in series and at least one active current limiting device connected in parallel with at least one of the two or more LEDs, the at least one additional LED circuit being connected to the at least one LED circuit in parallel. The at least one additional LED circuit may be capable of emitting light having one or more of a different color or wavelength than the at least one LED circuit in the device.

According to another aspect of the invention, the at least one LED circuit may include at least three LEDs connected in series.

According to another aspect of the invention, the LED lighting device may include a resistor connected in series with the at least one LED circuit.

According to another aspect of the invention, each active current limiting device may be a constant current regulator or a current limiting diode.

According to one aspect of the invention, an LED lighting device is provided. The LED lighting device includes at least one LED circuit having at least two LEDs connected in series and two sets of connection leads. The first set of connection leads in the device are configured to provide a connection to the at least two—as well as any additional—LEDs in the at least one LED circuit in order to provide a connection to all of the LEDs. The first set of connection leads having a first connection lead and a second connection lead, where the first connection lead is connected to an input of the at least one LED circuit and the second connection lead is connected to an output of the at least one LED circuit. The second set of connection leads in the device include a third connection lead and a fourth connection lead where the third connection lead is connected to the anode of at least one of the at least two LEDs and the fourth connection lead being connected to the cathode of at least one of the at least two LEDs. The second set of connection leads are configured to provide a connection to less than all of the LEDs in the at least one circuit, i.e. only one of two LEDs or only two of four LEDs, etc.

According to another aspect of the invention, at least two LEDs may be configured into at least two sets of LEDs connected in series. Each set of LEDs includes at least one LED, and may have multiple LEDs. The first connection leads may be configured to provide a connection to both of the at least a first and a second set of LEDs, while the second connection leads are configured to provide a connection to only one of the first or second set of LEDs.

According to another aspect of the invention, the at least one circuit may include at least three LEDs, the at least three LEDs being connected in series between the first and second connection lead. Each the at least three LEDs may be configured into at least three sets of LEDs, each set having at least one, and sometimes multiple, LED(s). When the at least one circuit includes at least three LEDs, the third connection lead may connect the anode of the first LED in one of the first, second or third sets of LEDs, i.e. the anode of the first LED in a particular set. The fourth connection lead may be connected to the cathode of the last LED in the same set of LEDs, i.e. if the third connection lead is connected to the anode of the first LED in the first set, the fourth connection lead may be connected to the cathode of the last LED in the first set.

According to another aspect of the invention, the lighting device may be integrated into a lighting system. The lighting system may include a driver having a bridge rectifier, at least two active current limiting devices, and at least three sets of driver connection leads. The first active current limiting device may be connected to the output of the bridge rectifier while the second active current limiting device may be electrically unconnected to the bridge rectifier and the first constant current diode. The first set of driver connection leads may provide a connection for the bridge rectifier to connect to an AC voltage source. The second set of driver connection leads may include a third driver connection lead providing an output from the first active current limiting device connected in series with the output of the bridge rectifier and a fourth driver connection lead providing a return from a load to the bridge rectifier. The third set of driver connections leads may include a fifth driver connection lead providing an input to the second active current limiting device, and a sixth driver connection lead providing an output from the second active current limiting device. When integrating the lighting device, the third driver connection lead may connect to the first connection lead of the lighting device and the fourth driver connection lead may connect to the second connection lead of the lighting device to drive the LED circuit. The fifth driver connection lead may connect to the third connection lead of the lighting device and the sixth driver connection lead may connect to the fourth connection lead of the lighting device to provide a bypass or shunt of the one or more LEDs located between the third and fourth connection leads of the lighting device.

According to one aspect of the invention, an LED lighting device is provided. The LED lighting device includes a bridge rectifier and at least one LED circuit having at least two LEDs connected in series across the output of the bridge rectifier. The lighting device includes two sets of connection leads. The first set of connection leads may be configured to provide a connection to the bridge rectifier with a first connection lead and a second connection lead. The first and second connection leads may be connected to provide an electrical input to and output from the bridge rectifier from an AC power source. The second set of connection leads may be configured to provide a connection to at least one of the least two LEDs connected in series across the output of the bridge rectifier. The second set of connection leads include a third connection lead and a fourth connection lead with the third connection lead being connected to the anode of one of the at least two LEDs and the fourth connection lead being connected to the cathode of one of the at least two LEDs. The second set of connection leads may be configured to provide a connection to all or less than all of the LEDs connected in series across the output of the bridge rectifier. The bridge rectifier may be constructed using diodes, LEDs, or some combination thereof.

According to one aspect of the invention a method of reducing total harmonic distortion in LED lighting circuits and devices is provided. The method requires that at least two LEDs be connected in series and that a bypass around or shunt at least one of the at least two LEDs connected in series is provided. A substantially constant current may be maintained flowing through at least one LED having while at least one LED is bypassed or shunted.

According to another aspect of the invention, an active current limiting device may be used as the bypass or shunt and connected in parallel with at least one of the at least two LEDs to provide the bypass or shunt. The active current limiting device may be a constant current regulator or a current limiting diode.

Apparatus and associated methods involve operation of an LED light engine in which relative intensities of selected wavelengths shift as a function of electrical excitation. In an illustrative example, current may be selectively and automatically diverted substantially away from at least one of a number of LEDs arranged in a series circuit until the current or its associated periodic excitation voltage reaches a predetermined threshold level. The diversion current may be smoothly reduced in transition as the excitation current or voltage rises substantially above the predetermined threshold level. A color temperature of the light output may be substantially changed as a predetermined function of the excitation voltage. For example, some embodiments may substantially increase or decrease a color temperature output by a solid state light engine in response to dimming the AC voltage excitation (e.g., by phase-cutting or amplitude modulation).

In various examples, selective current diversion within the LED string may extend the input current conduction angle and thereby substantially improve power factor and/or reduce harmonic distortion for AC LED lighting systems.

Various embodiments may achieve one or more advantages. For example, some embodiments may substantially reduce harmonic distortion on the AC input current waveform using, for example, very simple, low cost, and low power circuitry. In some embodiments, the additional circuitry to achieve substantially reduced harmonic distortion may include a single transistor, or may further include a second transistor and a current sense element. In some examples, a current sensor may be a resistive element through which a portion of an LED current flows. In some embodiments, significant size and manufacturing cost reductions may be achieved by integrating the harmonic improvement circuitry on a die with one or more LEDs controlled by harmonic improvement circuitry. In certain examples, harmonic improvement circuitry may be integrated with corresponding controlled LEDs on a common die without increasing the number of process steps required to manufacture the LEDs alone. In various embodiments, harmonic distortion of AC input current may be substantially improved for AC driven LED loads, for example, using either half-wave or full-wave rectification. Some implementations may require as few as two transistors and three resistors to provide a controlled bypass path to condition the input content for improved power quality in an AC LED light engine. Some implementations may provide a predetermined increase, decrease, or substantially constant color temperature over a selected range of input excitation.

The details of various embodiments are set forth in the accompanying drawings and the description below. Other features and advantages will be apparent from the description and drawings, and from the claims.

Accordingly, embodiments of an LED light engine with selective diversion circuitry may advantageously operate with a power factor substantially above 90%, 92.5%, 95%, 97.5%, or at least above about 98%, for example, and simultaneously achieve a THD substantially below 25%, for example, at the rated excitation voltage. Some embodiments of the AC LED light engine may further be substantially smoothly and continuously dimmable over a full range (e.g., 0-100%) of the applied excitation voltage under amplitude modulation and/or phase controlled modulation.

Some embodiments may provide a desired intensity and one or more corresponding color shift characteristics. Some embodiments may substantially reduce cost, size, component count, weight, reliability, and efficiency of a dimmable LED light source. In some embodiments, the selective current diversion circuitry may operate with reduced harmonic distortion and/or power factor on the AC input current waveform using, for example, very simple, low cost, and low power circuitry. Accordingly, some embodiments may reduce energy requirements for illumination, provide desired illumination intensity and color over a biological cycle using a simple dimmer control, and avoid illumination with undesired wavelengths. Some embodiments may advantageously be enclosed in a water-resistant housing to permit cleaning using pressurized cold water sprays. In several embodiments, the housing may be ruggedized, require low cost for materials and assembly, and provide substantial heat sinking to the LED light engine during operation. Various examples may include a lens to supply a substantially uniform and/or directed illumination pattern. Some embodiments may provide simple and low cost installation configurations that may include simple connection to a drop cord.

In some embodiments, the additional circuitry to achieve substantially reduced harmonic distortion may include a single transistor, or may further include a second transistor and a current sense element. In some examples, a current sensor may include a resistive element through which a portion of an LED current flows. In some embodiments, significant size and manufacturing cost reductions may be achieved by integrating the harmonic improvement circuitry on a die with one or more LEDs controlled by harmonic improvement circuitry. In certain examples, harmonic improvement circuitry may be integrated with corresponding controlled LEDs on a common die without increasing the number of process steps required to manufacture the LEDs.

Parameters to supply a desired AC excitation to an LED based light engine. In some implementations, AC excitation to the light engine may be provided using well-known solid state and/or electro-mechanical methods that may combine AC-DC rectification, DC-DC conversion (e.g., buck-boost, boost, buck, flyback), DC-AC inversion (e.g., half- or full-bridge, transformer coupled), and/or direct AC-AC conversion. Solid state switching techniques may use, for example, resonant (e.g., quasi-resonant, resonant), zero-cross (e.g., zero-current, zero-voltage) switching techniques, alone or in combination with appropriate modulation strategies (e.g., pulse density, pulse width, pulse-skipping, demand, or the like).

In an illustrative embodiment, a rectifier may receive an AC (e.g., sinusoidal) voltage and deliver substantially unidirectional current to LED modules arranged in series. An effective turn-on voltage of the LED load may be reduced by diverting current around at least one of the diodes in the string while the AC input voltage is below a predetermined level. In various examples, selective current diversion within the LED string may extend the input current conduction angle and thereby substantially reduce harmonic distortion for AC LED lighting systems.

In various embodiments, apparatus and methods may advantageously improve a power factor without introducing substantial resistive dissipation in series with the LED string. For example, by controlled modulation of one or more current paths through selected LEDs at predetermined threshold values of AC excitation, an LED load may provide increased effective turn on forward voltage levels for increased levels of AC excitation. For a given conduction angle, an effective current limiting resistance value to maintain a desired peak input excitation current may be accordingly reduced.

Various embodiments may provide substantially reduced light intensity modulation that may contribute to flicker, to the extent it may be potentially perceptible to humans or animals, by operating the LEDs to carry unidirectional current at twice the AC input excitation frequency. For example, a full-wave rectifier may supply 100 or 120 Hz load current (rectified sine wave), respectively, in response to 50 or 60 Hz sinusoidal input voltage excitation. The increased load frequency produces a corresponding increase in the flicker frequency of the illumination, which tends to push the flicker energy toward or beyond the level at which it can be perceived by humans or some animals. Moreover, some embodiments of a light engine with selective current diversion as described herein may substantially increase a conduction angle, which may correspondingly reduce a "dead time" during which no light is output by the LEDs. Such operation may further advantageously mitigate detectable light amplitude modulation effects, if any, in various embodiments.

Exemplary apparatus and associated methods may involve a bypass module for modulating conductivity of one or more current paths to provide a first set of LEDs that are conducting near minimum output illumination and having a larger conduction angle than that of a second set of LEDs that conduct at a maximum output illumination. In an illustrative example, the conductivity of a bypass path in parallel with a portion of the second set of LEDs may be reduced while the AC input excitation is above a predetermined threshold voltage or current.

In various examples, the current modulation may extend an effective conduction angle of an input excitation current drawn from an electrical source. For example, selective current diversion within the LED string may extend the input current conduction angle and thereby substantially reduce harmonic distortion for AC LED lighting systems.

Other advantages and aspects of the present invention will become apparent upon reading the following description of the drawings and detailed description of the invention.

DETAILED DESCRIPTION OF PREFERRED EMBODIMENTS

While this invention is susceptible to embodiments in many different forms, there is described in detail herein, various embodiments of the invention with the understanding that the present disclosures are to be considered as exemplifications of the principles of the invention and are not intended to limit the broad aspects of the invention to the embodiments illustrated.

The present invention is directed to multiple lighting devices or systems, the light emitting circuits contained therein, and methods of driving and operating the same. As discussed herein, a lighting device may include any device capable of emitting light no matter the intention. Examples of lighting devices which are contemplated by this invention include, but are not limited to, LED chips, LED packages, LED chip on board assemblies, LED assemblies or LED modules. The devices may also include any required power connections or leads or contacts, or drivers, required to provide power to the circuits and allow the circuits within the device to emit light. A lighting system may include multiple such devices, and some or all of the required parts to drive such a device or multiple devices, including but not limited to, power supplies, transformers, inverters, rectifiers, sensors or light emitting circuitry discussed herein. While a lighting device may be incorporated into a lighting system or into a lamp or light bulb, it is contemplated that any required light emitting elements may be included within the system directly, whether in the form of a device as a chip or package, or as circuits within the system.

The purposes of the devices described herein are twofold, and may be accomplished independent of each other. One intention of the devices described herein is to provide an LED lighting device capable of efficiently and economically emitting light having a selectable color temperature or a warm-on-dim feature when driven with AC power. The second intention of the devices described herein is to provide LED lighting devices which have an improved power factor and a reduced total harmonic distortion when powered with AC power.

Figure 1:
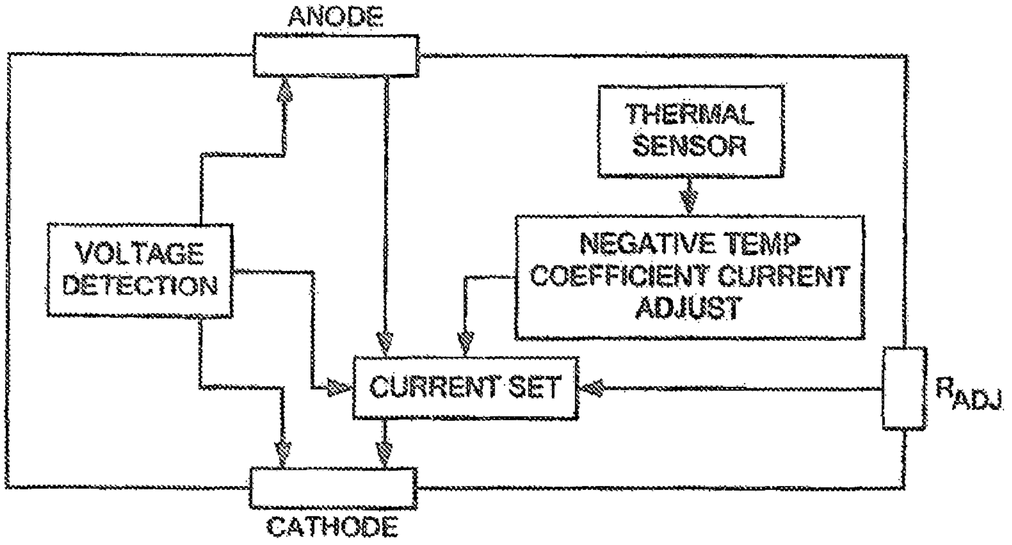
FIG. 1 shows a block diagram of a constant current regulator which may be used with the invention.

In order to achieve either of the goals of the devices described herein, it may be necessary to include one or more active current limiting devices within each LED lighting device, regardless of whether the device is designed to allow color temperature control, increase power factor while reducing THD, or both. While any known current limiting device which sets a substantially upper limit on the current which is allowed to flow through a circuit may be used with any of the circuits or devices described herein, the devices in the present application will primarily discuss using a constant current regulator (CCR), like for example those sold by ON Semiconductor or operating having the internal structures as shown in the block diagram of FIG. 1, and a current limiting or current controlled diode (CLD). Both CCRs and CLDs actively limit the current flowing through a particular circuit or device by substantially limiting the current to, and maintaining the current at, a threshold level once the current in a connected circuit or device has reached or exceeded a particular value. Using such devices is advantageous over using current limiting resistors insofar as CCRs and CLDs both cap the total current which is allowed to flow through a connected circuit or device, while the resistor only acts to reduce any every climbing current. With a current limiting resistor, as the input voltage to the circuit continues to increase, the current will likewise continue to increase without limit, albeit it at a lower value than without the resistor. With a CCR or a CLD, once the current reaches a threshold maximum, the current will remain substantially constant until the input voltage is reduced, even if the input voltage continues to climb. As will be described herein, in some cases the combination of a CCR or CLD and a current limiting resistor may be beneficial or required.

While both CCRs and CLDs may be used interchangeably to accomplish the goals of the devices described herein, there are differences between the devices. The primary difference between the devices is that CCRs, like those sold by ON Semiconductor, typically have internal transistor based control circuits and have little or no turn on voltage. CLDs are a form of a diode which are based in part on a JFET having a gate shorted to the power source and have a measurable turn on voltage. While the CLDs may be utilized with any of the devices described herein, it may be advantageous to use a CCR when possible in order to avoid the additional turn on voltage requirements of the CLD. However, CCRs and CLDs may be used interchangeably to accomplish the goals of the invention.

FIGS. 2-5 show exemplary LED lighting devices capable of emitting color temperature controlled light. As seen in FIG. 2A, lighting device 10 includes at least two LED circuits 12, 14 which are connected in parallel. Each LED circuit 12, 14 includes one or more LEDs 16, 18 respectively. Each LED circuit 12, 14 has a different forward operating voltage and is capable of emitting light having one or more of a different color or a different wavelength than the other circuit. For example, LED circuit 12 may emit amber or yellow light, while LED circuit 14 emits white or blue light. In order to limit the current within either LED circuit 12, 14, an active current limiting device such as a CCR or CLD, shown as CCR 20 connected in series with at least one LED 16 in first circuit 12, may be provided. As seen in FIG. 2B, additional active current limiting devices, like for example CCR 22, may be added to the device so that each LED circuit is connected in series with an active current limiting device. LED device 10 may further include connection leads 24, 26 for connecting the device to an AC power source, like for example mains power or a switch or dimmer connected to mains power. In order to fully utilize AC power and produce a substantially constant light output, device 10 and/or circuits 12, 14 should be configured such that each circuit 12, 14 is capable of emitting light during both a positive and negative phase of the provided AC voltage.

Figure 2A:
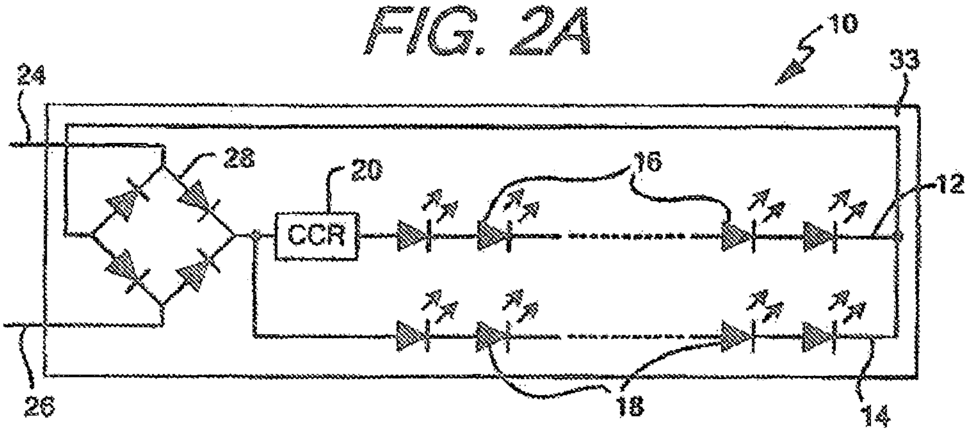
FIG. 2A shows a color temperature controllable LED lighting device as contemplated by the invention.
Figure 2B:
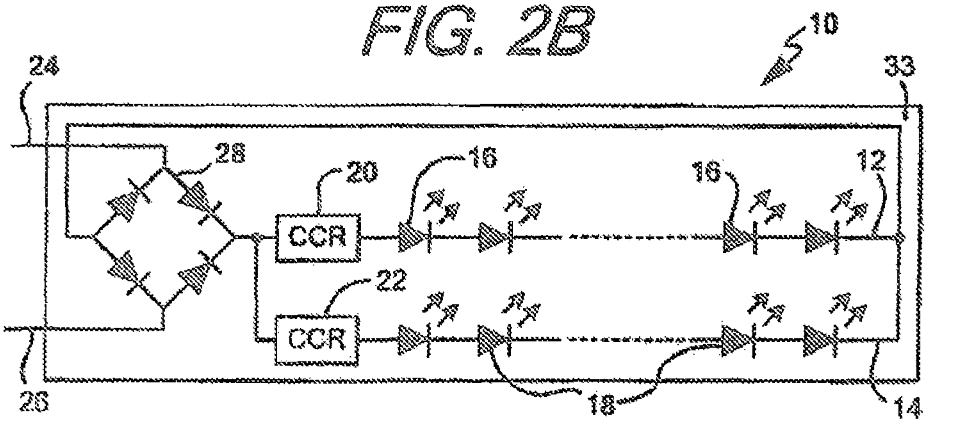
FIG. 2B shows a color temperature controllable LED lighting device as contemplated by the invention.

In devices where one or both of LED circuits 12, 14 include only a single LED, or, as shown in FIGS. 2A and 2B a series string of LEDs 16, 18 respectively, in order to insure each circuit emits light during both the positive and negative phase of the provided AC power device 10 may include bridge rectifier 28. The electrical inputs of bridge rectifier 28 may connect directly to leads 24, 26, while the output and return of the bridge rectifier connects to parallel circuits 12, 14, providing rectified AC power to each circuit. Providing the rectified power insures that each circuit is capable of emitting light during both the positive and negative when device 10 is electrically connected to an AC power source. When utilized herein, unless otherwise noted, connecting an LED circuit across the output of a bridge rectifier refers to connecting the LED circuit to both the output and return of the bridge rectifier, such that the circuit receives power from the output of the bridge rectifier at one end and has a return path to the return of the bridge rectifier, effectively creating a closed loop between the LED circuit and the bridge rectifier.

Figure 3A:
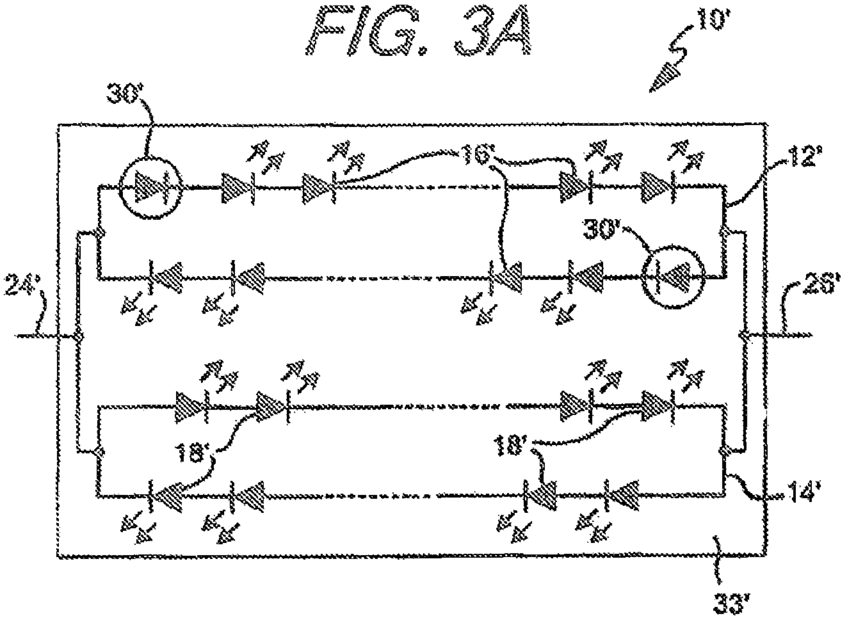
FIG. 3A shows a color temperature controllable LED lighting device as contemplated by the invention.
Figure 3B:
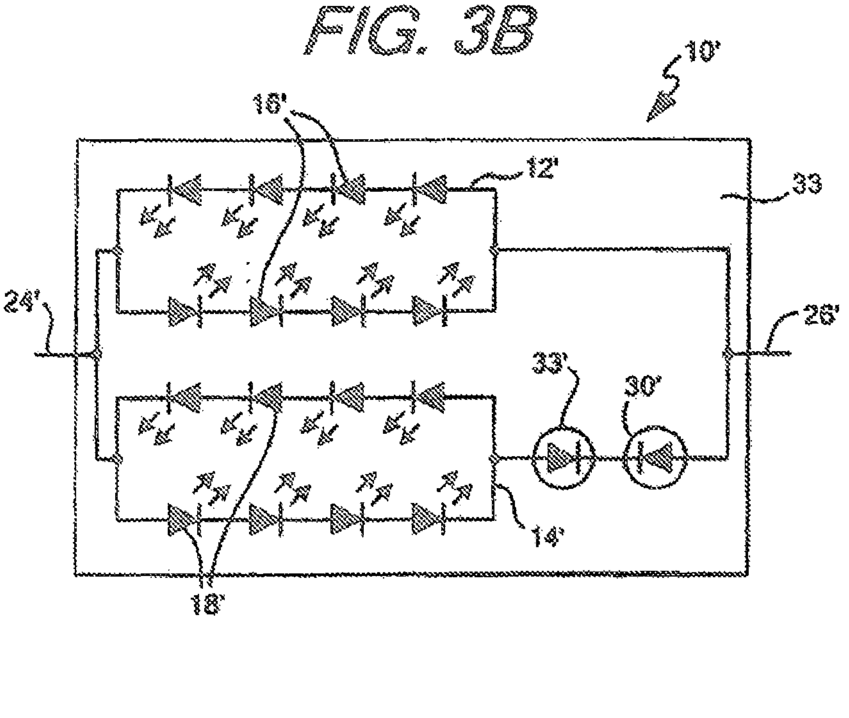
FIG. 3B shows a color temperature controllable LED lighting device as contemplated by the invention.

While single LEDs or series strings like LED circuits 12, 14 may require device 10 to include a bridge rectifier to utilize both phases of connected AC power, one or more of circuits 12, 14 may be modified to use direct AC power without the requirement of rectification. For example, as seen in FIGS. 3A and 3B, device 10' may include LED circuits 12', 14' where each circuit includes at least one LED 16', 18' respectively, connected in an antiparallel configuration. With LEDs 16', 18' connected in an anti-parallel configuration, LED circuits 12', 14' are capable of emitting light during both phases of AC power without the need for rectification as each circuit has one or more LEDs configured to use both the positive and negative phase of a connected AC power source. As a result, circuits 12', 14' may be directly connected to leads 24', 26' as shown in FIGS. 3A and 3B without an intervening rectifier. When utilizing an anti-parallel configuration, however, in order to protect the LEDs during both phases of AC power in at least one of circuit 12', 14', more than one active current limiting device may be required. For example, as seen in FIG. 3A, each anti-parallel branch in circuit 12' (or 14') may include an active current limiting device, which may be either a CCR or CLDs 30'. Rather than connect one current limiting device in series with each branch of anti-parallel circuit 12', back-to-back CLDs or CCRs may be attached at one end of the circuit, between circuit 12' and either lead 24' or 26' as seen in FIG. 3B. Inasmuch as both CLDs and CCRs have very low reverse breakdown characteristics, it is possible to connect CLDs or CCRs in a back-to-back fashion and realize the current protecting features of the forward-biased CLD or CCR.

Figure 4:
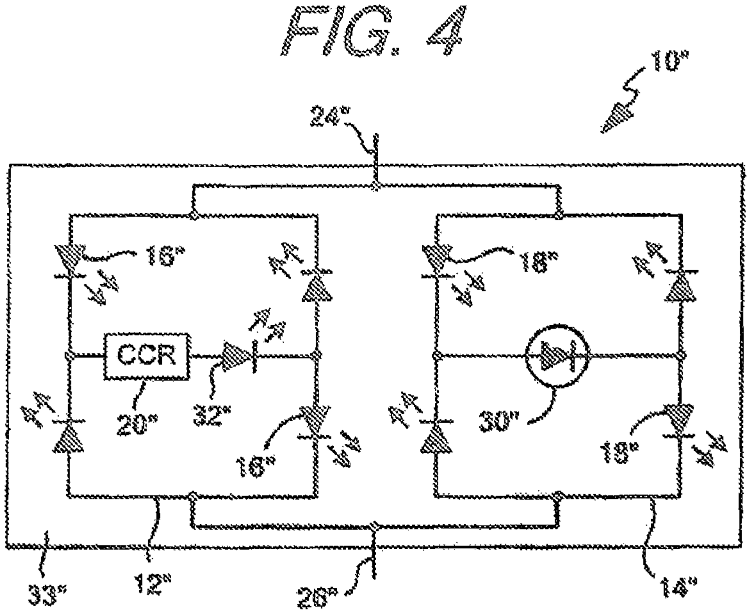
FIG. 4 shows a color temperature controllable LED lighting device as contemplated by the invention.

Other circuit configurations which may directly use AC power may be utilized in the LED lighting device as well. For example, rather than use a separate bridge rectifier connected to circuits having a single LED or series string of LEDs, one or more of the LED circuits may be configured in a bridge rectifier configuration with an additional diode, LED, CLD or CCR connected across the output of the rectifier. As seen in FIG. 4 LED lighting device 10" may include circuits 12", 14" which each include at least five diodes, at least four of the diodes being LEDs 16", 18" respectively. LEDs 16", 18" may be configured in a bridge rectifier configuration with a fifth diode, which may be a standard diode, LED 32" as shown in circuit 12", or CLD 30" as shown in circuit 14". Configuring circuit 10" in a bridge configuration with a diode, LED, or active current limiting device across the output of the rectifier allows for AC power to be used during both the positive and negative phase when provided to device 10". As a result, like the device shown in 10', circuits 12", 14" may be directly connected to connection leads 24", 26" without an intervening bridge rectifier. As seen in each circuit, unlike the circuits shown in FIG. 2, a single active current limiting device may be used to protect each of circuit 12", 14" if it is located across the output of each rectifier circuit. Inasmuch as current will flow through the at least fifth diode during both the positive and negative phases, placing the active current limiting device in series with the at least fifth diode (or making the at least fifth diode the active current limiting device) will insure that current during both phases of provided AC power flows through the current limiting device, effectively limiting the current for each LED within the circuit.

Figure 5:
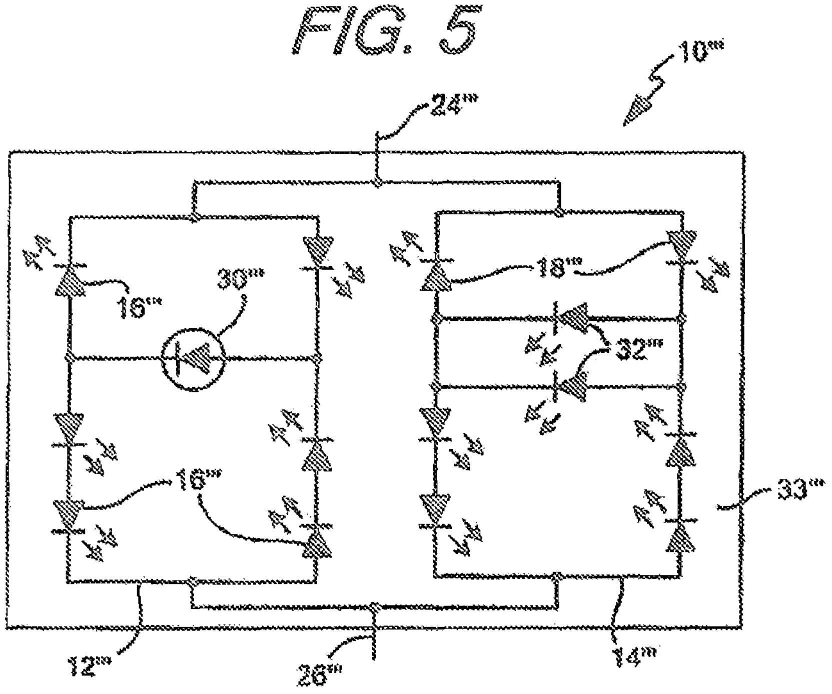
FIG. 5 shows a color temperature controllable LED lighting device as contemplated by the invention.

In order to further protect the LEDs in a circuit directly using AC power, each circuit in the LED lighting device may be configured in an imbalanced bridge configuration. As seen in FIG. 5, device 10'" may include circuits 12'", 14'" which each include at least diodes, at least six of which are LEDs connected in an imbalanced bridge configuration. The imbalanced bridge configuration-will act substantially similar to, and have substantially the same characteristics as the circuits described in FIG. 4 with the added benefit of reverse breakdown protection for the LEDs forming the bridge. In order to imbalance the bridge, at least one additional LED is placed in series with one input LED (shown as the left branch of circuits 12'", 14'") than the other input LED, and at least one additional LED is placed in series with the opposing output LED (output LED during the opposite phase) than the aligned output LED. Configuring the LEDs forming the bridge in this manner helps reduce reverse breakdown of any of the LEDs in the circuit. Like a standard bridge, the cross-connecting branch across the output of the imbalanced bridge may be a standard diode, LED 32'", CLD 30'", or some combination thereof.

While FIGS. 2-5 show each of the aforementioned circuits in pairs, it is contemplated that the circuits disclosed in each FIG. may be mixed and matched within a single device as desired. For example, an LED lighting device may be made using circuits 12, 14" or 12', 14'". Additional circuits may further be connected in parallel within a single device, the additional circuits having a different forward operating voltage than the other connected circuits, and each additional circuit being capable of emitting light of a different color than the other connected LED circuits within the device. The additional circuits may be configured in any manner shown in FIGS. 2-5 and connected to or include any rectifiers or connection leads as needed to receive power and emit light during both phases of any provided AC power.

Regardless of how many circuits are connected in parallel and the configuration of each circuit, any circuits forming an LED lighting device, along with the at least one active current limiting device, the connection leads and any required rectifiers or additional current limiting devices may be integrated on a single substrate 33 (FIGS. 2A, 2B), 33' (FIGS. 3A, 3B), 33" (FIG. 4), or 33'" (FIG. 5). The single substrate may then be directly incorporated into a lighting system or fixture, or a lamp or light bulb as desired.

While any known method for creating LED circuits capable of emitting light of a different color within a single device is contemplated by the invention, two examples will be discussed herein.

The first method by which the light emitted by each circuit may be made different is by using a different phosphor coating on each circuit. When using a phosphor coating, the color of the LEDs used in each circuit, for example LEDs 16, 18 in FIG. 2A, may emit a substantially similar color, like for example blue, or different colors, as the phosphor coating substantially creating the different colors of emission light for each circuit. Though the device and circuits of FIG. 2A will be used for examples herein, it should be appreciated that the devices and circuits of FIG. 2B-5, or any combination of circuits as discussed above, may be used in substantially the same manner to achieve substantially the same effect.

In order to create different forward operating voltages when using a phosphor coating, different colored LEDs having a different turn on voltage may be used, or the circuits may utilize a different number of similar colored LEDs. For example, a first circuit, like circuit 12 in FIG. 2A, may include five blue LEDs and be coated in yellow or amber phosphor, while circuit 14 may include 10 blue LEDs and be coated in white phosphor. Since the first circuit includes fewer LEDs, it will begin operating first as it will have a lower turn on voltage, causing the emission of light by device 10 substantially equal to the color of the phosphor coating on circuit 12, or yellow or amber. As the voltage provided to device 10 increases, the current flowing through circuit 12 will increase, causing the yellow or amber light to more brightly emit. The current flowing through circuit 12 will continue to increase until the current threshold of the at least one active current limiting device (CCR 20) connected in series therewith is reached. It should be noted that when only a single active current limiting device is used, it is important that the current limiting device be connected to the circuit having the lower turn on voltage in order to protect and prevent the LEDs of the circuit from overdriving as the voltage is increased to turn on and intensify the LEDs of the LED circuit having the higher turn on voltage.

Using the example of a five "blue LED circuit coated in yellow or amber phosphor and a ten blue LED circuit coated in white phosphor for circuits 12, 14 given above, as is known in the art, each blue LED has a turn on voltage of approximately 2.2V and will reach a nominal operating current at approximately 3.2V. The total turn on voltage for circuit 12 having five blue LEDs would therefore be approximately 11V (2.2V time five LEDs) while the nominal current would reached at approximately 16V. The turn on voltage for circuit 14 would be approximately 22V with the nominal current being reached at approximately 32V. Using this example, as voltage is applied to device 10 in FIG. 2A, once the applied voltage reaches 11V (assuming a CCR is connected as the active current limiting device, otherwise slightly higher than 11V if a CLD is used), LEDs 16 of circuit 12 will begin to emit light, which will be yellow or amber as a result of the phosphor coating applied to the circuit. The brightness of the light emitted by device 10 and circuit 12 will increase until the current flowing through circuit 12 reaches the maximum threshold of CCR 20. If the maximum threshold current of CCR 20 is matched to nominal current of LEDs 16, this means that the current will be capped once 16V input is reached, which is well below the turn on or voltage for nominal current in circuit 14. Having the CCR connected in series with circuit 12 will prevent the overdrive of LEDs 16, protecting them from early burnout resulting from overdrive or overheating as the voltage increases to turn on circuit 14.

Once the input voltage is increased to 22V, LEDs 18 of circuit 14 will begin emitting white light as a result of the white phosphor coating. As circuit 14 begins emitting white light, the combination of yellow or amber and white light will be emitted by device 10, causing the color temperature to begin moving towards the cooler end of the color spectrum. As the voltage continues to increase to device 10, the amount of white light mixed in with the already fully emitted yellow or amber light will continue to increase as the current in circuit 14 increases, causing the color temperature to become cooler and cooler. As is shown in FIG. 2B, an additional or second active current limiting device may be included in device 10, CCR 22, which may limit the current within circuit 14 to the nominal current which will be reached at approximately 32V. Using this example, if CCR 22 is used in device IO, the maximum light output of device 10 will be reached at 32V along with the coolest possible temperature color. If the provided voltage increases over 32V, substantially no additional current will flow through either circuit, setting the uppermost light output of each circuit. When the voltage begins to be reduced and device 10 is dimmed, once the voltage begins falling below 32V, circuit 14 will begin emitting less white colored light as the current will drop below nominal level. As the current in circuit 14 decreases and circuit 14 dims, the light emitted by device 10 will both dim and become warmer as the yellow or amber component will become a larger percentage of the light emitted. Eventually at approximately 22V, circuit 14 will turn off and the only light emitted by device 10 will come from circuit 12, providing less light and creating a warmer yellow or amber light than when both circuit 12 and 14 were emitting light.

By using a set amount of LEDs in each LED circuit and setting the current at a level for one or more of the circuits, the amount of each color of light emitted by the device may be controlled by controlling the input voltage, and the color temperature change and light intensity characteristics can be known and tailored to a desired output.

The second method by which the color of the light emitted by the circuits may be made different is by using different colored LEDs in each circuit. The different colored LEDs will emit light of different colors, thereby causing each circuit to emit light of different colors. However, rather than using different numbers of LEDs to different forward operating voltages, the turn on voltage characteristics of the different colored LEDs may utilized to create the difference depending on the colors of the LEDs in the circuits. As is known in the art, there are two common turn on voltages for LEDs emitting colored light. The first turn on voltage is approximately 1.5V for InP diodes which are typically red, amber and yellow LEDs which each reach their nominal operating current at about 2.2V. The second turn on voltage is approximately 2.2V for GaN diodes which are typically green or blue which reach their nominal operating current at about 3.2V.

When using different colored LEDs, in order to create the amber-white device like that described above, circuit 12 may include five LEDs 16 which emit amber light while circuit 14 may include five LEDs 18 which emit blue light and are coated in white phosphor. Using this example, circuit 12 will begin emitting light at approximately 7.5V (again, if a CCR is connected in series, and at a higher voltage if a CLD is used) and reach nominal current at approximately 11V. Circuit 14 will begin emitting light at 11V but will not reach nominal current until approximately 16V. As circuit 12 begins to emit, a low level of amber light will be emitted by device 10 until the current value of the series active current limiting device is reached. The active current limiting device connected in series with the LEDs of circuit 12 may be set to prevent the current from rising higher than the nominal current value for the circuit, effectively fixing the intensity of light emitted by circuit 12 while protecting the one or more LEDs therein from overdrive as the voltage increases. As the voltage increases to 11V, circuit 14 will begin emitting white light, cooling the color temperature of the light emitted by device 10. The cooling will continue until either the voltage stops rising, or an active current limiting device connected in series with circuit 14 prevents the current flowing through circuit 14 from rising higher. As the voltage is decreased, the current and intensity of light emitted by circuit 14 will fall, causing the light to both dim and become warmer as the amount of light emitted from the amber LEDs will provide a greater percentage of the light emitted, creating a wanner color temperature colored light. At approximately 11V circuit 14 will turn off, and only circuit 12 and the amber LEDs will continue to emit light, creating a warmer and dimmer light as only the amber colored LEDs will be emitting light at this voltage. As the voltage continues to drop towards 7.5V, the amber LEDs will become dimmer and eventually turn off.

Figure 6:
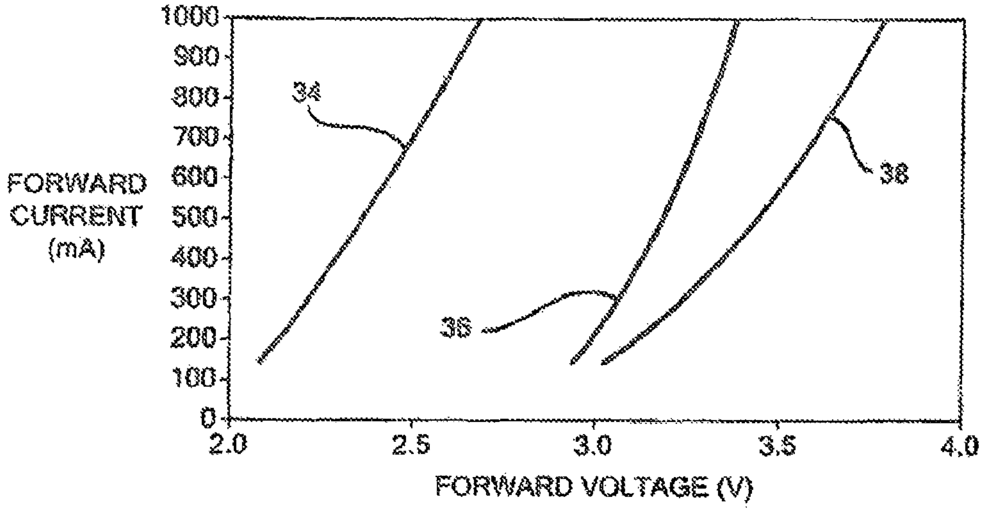
FIG. 6 shows a graphical representation of the forward voltage versus forward current for various colors of LEDs.
Figure 7:
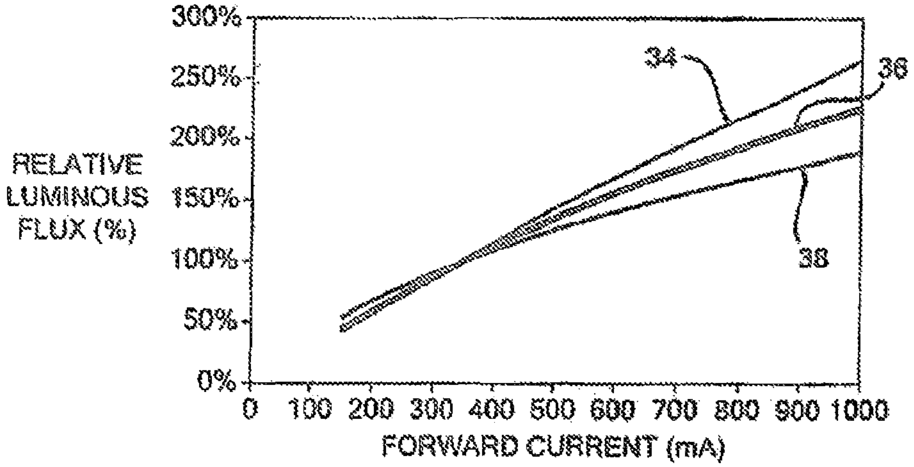
FIG. 7 shows a graphical representation of the forward current versus the relative luminous flux for various colors of LEDs.

FIGS. 6 and 7 show the forward operating voltage and current characteristics for red (lines indicated by 34), blue (lines indicated by 36), and green (lines indicated by 38) LEDs. These graphical representations of the forward voltage for each LED vs. the forward operating current for each LED and the forward operating current for each LED vs. the luminous flux of each LED show the operating characteristics of different colored LEDs and the importance of connecting an active current limiting device in series with at least the lowest turn on voltage in the, device. As seen in FIG. 7, each LED color reaches approximately 100% relative luminous flux, i.e. nominal flux, at around 350 mA. Less current than this will cause the LEDs to emit less than 100% flux while more current will overdrive the LEDs, causing more than 100% flux and unwanted heat and eventual breakdown or premature failure. FIG. 5 shows that red LEDs typically reach 350 mA around 2.2V (which is substantially similar for yellow or amber LEDs), blue LEDs around 3.1V, and green LEDs around 3.3V. Using the example above with circuit 12 having five amber LEDs and circuit 14 having five blue LEDs and being coated in white phosphor, by the time the blue LEDs reach nominal current and luminosity, approximately 15.5V-16V will be applied to each of circuit 12, 14 as they are connected in parallel. Assuming each amber LED will have an approximately equal amount of voltage across it, this means that each amber LED will have approximately 3.1V-3.2V like the blue LEDs. As seen in FIG. 6, this will cause a current of greater than 1000 mA to flow through each amber LED, and as seen in FIG. 7 cause of luminous flux of greater than 200%. This places the amber LEDs at significant risk for overheating and overdriving, causing potential premature failure of the LEDs. By placing the active current limiting device in series with circuit 12, the current is effectively limited at the selected value, i.e. the nominal value, and as the voltage applied to circuit 12 increases, the circuits are current limited and the one or more LEDs therein are protected. However, as seen in FIG. 6, slight variations in voltage across each LED can cause significant increases in the current through each LED. Therefore, it may be advantageous to place an active current limiting device in series with each LED circuit in the device, in order to protect each circuit against increases or spikes in voltage.

Figure 8:
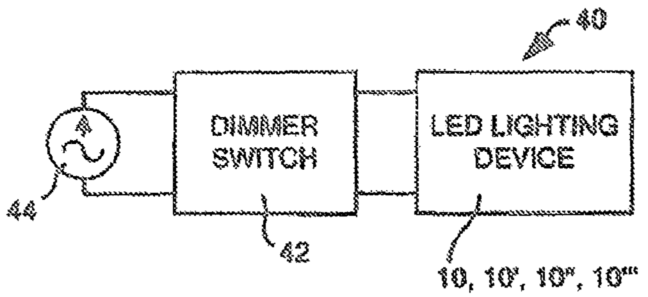
FIG. 8 shows a diagram of a lighting system in which the color temperature controllable LED lighting devices of FIGS. 1-4 may be used.

In order to control the power provided to device 10, and therefore the voltage and current provided to each circuit and the overall color temperature of the light emitted by device 10 (or 10', 10", 10'"), the power provided to device 10 may be adjusted and controlled using any means known in the art. For example, device 10 may be integrated into a lighting system or fixture 40 having a dimmer switch providing the AC power to device 10. As seen in FIG. 8, dimmer switch 42 may be connected to AC power source 44, which may be, for example, mains power or a dimmer switch connected to mains power, and may be used to control the voltage provided to device 10. The dimmer switch may be any known in the art, like for example, a phase dimmer switch. The dimmer switch may be used to control the voltage to the circuit, causing more or less voltage to be applied to device 10. As the dimmer switch is turned to provide more voltage to the circuit, circuit 12 which may have amber colored LEDs or be coated in amber phosphor may be turned on and increased in intensity. As the switch continues to be turned and provide more power and voltage to the device, circuit 14, which may have blue LEDs or be coated in white phosphor, will turn on and add to the intensity of light emitted by device 10. As the dimmer switch is continually turned up and the light emitted by circuit 14 increases, the intensity of the light emitted by device 10 will increase while the color temperature decreases. When dimmer switch 42 is finally turned down and less voltage is provided to device 10, eventually circuit 14 will begin decreasing in intensity, causing the circuit 12 to produce a greater percentage of the light emitted by device 10, causing the light to have a warmer color temperature.

While the circuits, devices and systems described above will provide an AC LED lighting device option having the ability warm on dim, AC LED devices may be further or alternatively enhanced by increasing the power factor and reducing the total harmonic distortion (THD) of the devices and light emitting circuits therein.

Figure 9:
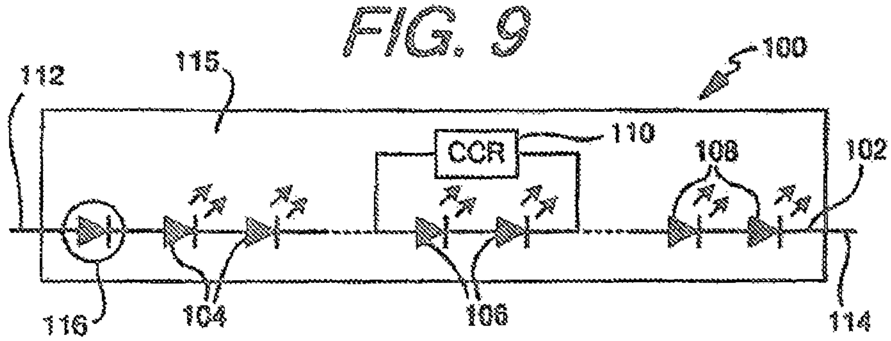
FIG. 9 shows a lighting device having an increased power factor and reduced total harmonic distortion as contemplated by the invention.

FIGS. 9-13 show LED lighting devices which have both an increased power factor and a reduced THD regardless of the color of the LEDs contained therein. As seen in FIG. 9, device 100 includes at least one LED circuit, LED circuit I 02, having at least two or more LEDs, LEDs 104, 106, 108, connected in series. Connected in parallel with at least one of the LEDs, shown as LEDs 106, is an active current limiting device, shown as CCR 110. As discussed throughout, though a CCR may be advantageous due to its low or non-existent turn on voltage, using a CLD may replace CCR and accomplish similar results. When using a CLD, however, the turn on voltage of the CLD will at least somewhat lower the power factor gains and reduction of THD realized by using a CCR. When connected in parallel with LEDs 106 (and any additional LEDs), the active current limiting device will provide a current bypass around the LEDs until the turn on voltage for the bypassed or shunted LEDs is reached. This will allow LEDs 104, 108 in circuit 102 to turn on earlier than if all LEDs had to be turned on before any LEDs emit light when a voltage is applied to connection leads 112, 114, increasing the power factor of the circuit. For as long as the active current limiting device is utilized to bypass or shunt LEDs 106, the current flowing through LEDs 104, 108 will be effectively limited and controlled. The controlled current will protect LEDs 104, 108 as the voltage is increased to turn on LEDs 106 and substantially reduce the effect of any harmonic currents created by the non-linear reacting LEDs. The harmonic currents and current gains and non-linearity can be effectively reduced by controlling a threshold amount current flowing through the circuit until the additional LEDs are ready to turn on. As with color temperature controlled LED lighting devices, all elements of any low THD LED lighting devices may be integrated on a single substrate 115, not matter the configuration and elements included within the device.

Figure 10:
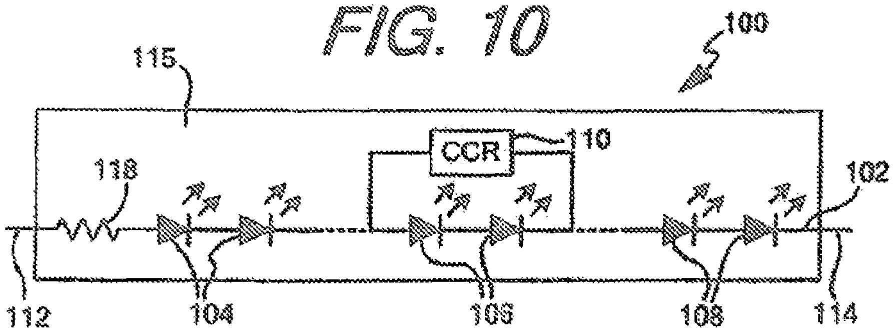
FIG. 10 shows a lighting device having an increased power factor and reduced total harmonic distortion as contemplated by the invention.

While CCR 110 will help keep the current limited to a threshold value while LEDs 106 are bypassed, once the input voltage to device 100 reaches a level where LEDs 106 will turn on with LEDs 104, 108, the current will be allowed to increase unimpeded through circuit 102 as current will substantially flow through LEDs 104, 106, 108 without a limiter in place to maintain the current. In order to protect all the LEDs in circuit 102 once LEDs 106 reach their turn on voltage, a second active current limiting device, shown in FIG. 9 as CLD 116 though it may advantageously be a CCR substantially eliminating any turn on voltage, and/or a current limiting resistor 118 (as shown in FIG. 10 for example) may be connected in series with LEDs 104, 106, 108 and formed as part of circuit 102. The additional current limiting device or current limiting resistor will help keep the current in the circuit down once LEDs 106 turn on, with the active current limiting device having the added benefit of creating an upper threshold of current flowing through the circuit.

While circuit 102 in FIGS. 9 and 10 are capable of being driven off of DC power, in order to connect and drive device 100 with AC power where THD and power factor present a greater problem, like for example mains power, device 100 may be integrated into a system or connected to a driver having a bridge rectifier, wherein rectified power is provided to circuit 102 through connection leads 112, 114. Alternatively, an additional circuit substantially identical to circuit 102 may be connected to circuit 102 in an anti-parallel configuration (like for example circuits 12" in FIG. 3A) to utilize both the positive and negative phases of a supplied AC power. Each circuit may then have a connection to leads 112, 114 to receive a provided AC power and operate during its respective phase.

Figure 12:
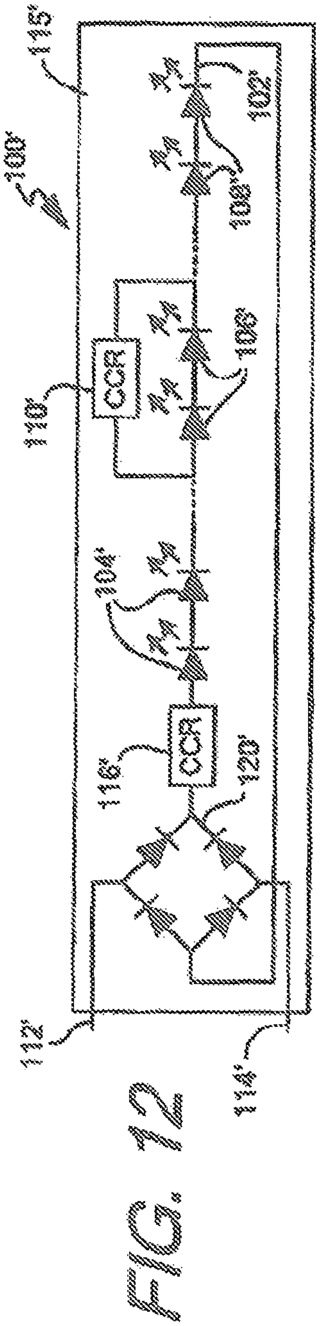
FIG. 12 shows a lighting device having an increased power factor and reduced total harmonic distortion as contemplated by the invention.
Figure 13:
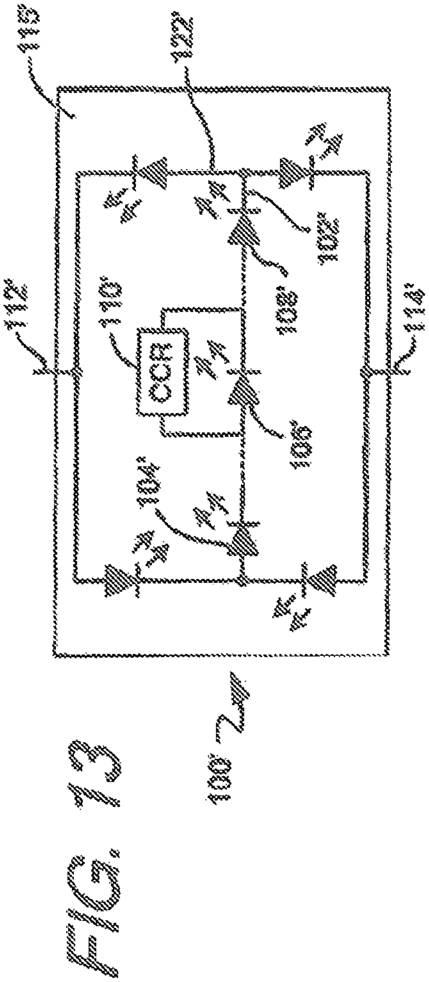
FIG. 13 shows a lighting device having an increased power factor and reduced total harmonic distortion as contemplated by the invention.

Alternatively, as seen in FIGS. 12 and 13, device 100' may include a bridge rectifier 120 or 122 with circuit 102 connected across the output, either internally or externally. When a bridge rectifier is incorporated into the device, leads 112, 114 may connect to the inputs of the rectifier, allowing the rectifier to receive AC power from an AC power source. Circuit 102 may then connect across the output of the rectifier, receiving and utilizing the rectified AC power. The bridge rectifier may be made using standard diodes, LEDs or some combination thereof.

Figure 11:
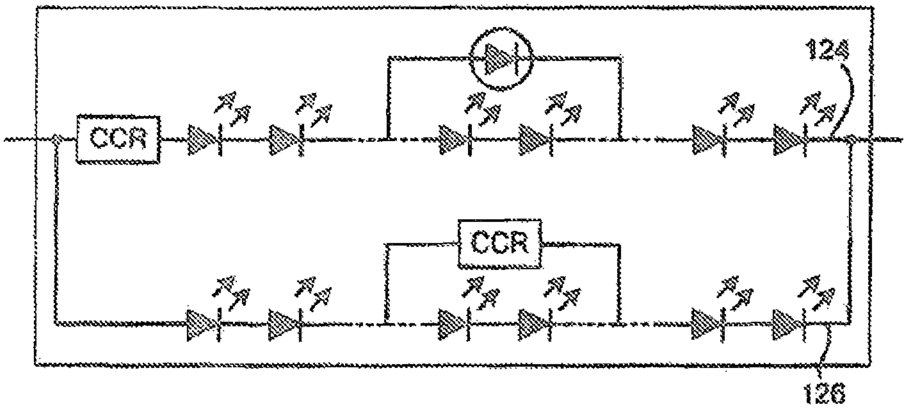
FIG. 11 shows a lighting device having an increased power factor and reduced total harmonic distortion as contemplated by the invention.

As seen in FIG. 11, a THD lowering active current device may be utilized in devices having color changing LEDs as well. As seen in FIG. 11, circuits 124, 126 may be substantially identical and placed in parallel with each other. Like circuits 12, 14 in FIG. 2A, for example, circuit 124, 126 may each have a different forward operating voltage and be capable of emitting light of a different color. Circuits 124, 126 may be incorporated into a system or driven by a driver having a bridge rectifier, or may be used to replace any of circuits 12, 14 or 12', 14' in FIGS. 2-3. The parallel current limiting device in each circuit will have substantially the same effect as described above, allowing some of the LEDs in the lower voltage circuit to turn on at a lower voltage than all of the LEDs, and reduce the harmonic distortion current resulting from the non-linearity of the LEDs. A portion of the LEDs in the higher voltage circuit may likewise turn on earlier, creating further temperature control as more intermediate levels of color may be realized as only some LEDs in the higher voltage circuit may turn on at first before all LEDs in the higher voltage circuit turn on. This configuration may allow for some or all LEDS in the lower voltage circuit to turn on, followed by some LEDs in the higher voltage circuit to turn on, beginning a cooling or warming of the light emitted by the device before all the LEDs are turned on. Eventually, shunted LEDs will turn on, further cooling or warming the light emitted by the device as it provided power and voltage increase.

Figure 14:
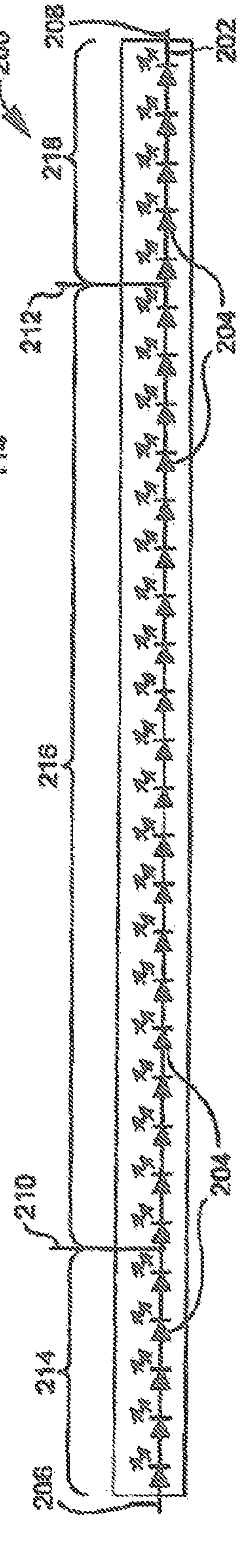
FIG. 14 shows a lighting device having multiple power connection leads for increasing power factor and reducing total harmonic distortion as contemplated by the invention.
Figure 15:
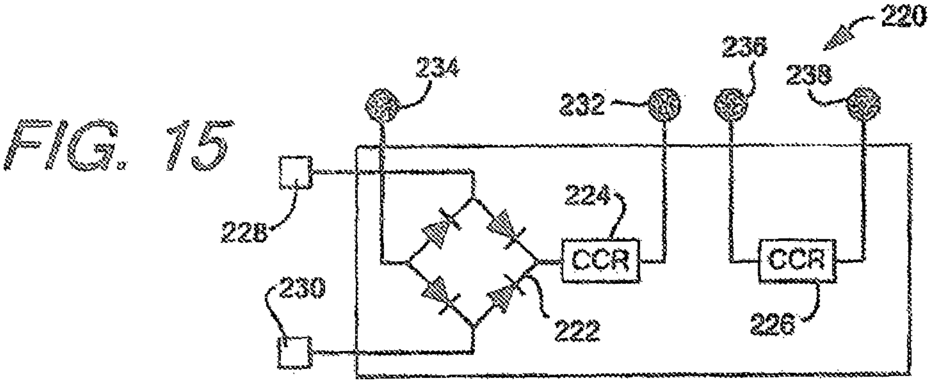
FIG. 15 shows a driver for driving to the device of FIG. 13.

An example of a driver and alternative lighting device which may be used to create a lower THD LED lighting device when driven with AC power may be seen in FIGS. 14 and 15. As seen in FIG. 14, LED lighting device 200 may include LED circuit 202 having at least two LEDs, shown as LEDs 204 connected in series. Device 200 may include a first set of connection leads 206, 208 which are connected to the input and output of circuit 202, effectively providing a connection to all of the LEDs within the circuit. A second set of connection leads 210, 212 may be provided as well. Connection leads 210, 212 may provide a connection to the anode of one LED and a connection to the cathode of one LED respectively. Connection leads 210, 212 may be configured, as seen in FIG. 14, to provide a connection to less than all of the LEDs in circuit 202. The first set of connection leads may be used to receive and return power for circuit 202, while the second set of connection leads may be used to connect a bypass or shunt, like for example an active current limiting device, to a subset or a portion of the LEDs forming circuit 202. Though shown as extending outside device 200, it should be understood that where power connections are used herein, whether with device 200, driver 220, or alternative devices 200', that any power connections may extend outside the device or include contacts formed as a portion of the device on or inside the substrate.

Each group of LEDs located either inside or outside the second set of connection leads may get categorized as a group, and may include additional connection leads as needed. For example, group 214 may comprise a first set of LEDs, group 216 may comprise a second group of LEDs and group 218 may comprise a third group of LEDs. Though shown in FIG. 14 as providing a connection to group 216, it should be appreciated that connection leads 210, 212 may be moved to provide a connection to group 214 or group 218. A third set of connection leads may also be provided to provide a connection to a second group, to create a further bypass or shunt if needed.

Providing device 200 with second connection leads 210, 212 instead of a fixed active current limiting device allows for an end user to better control the current that will flow through circuit 202 when the LEDs between connection leads 210, 212 are bypassed or shunted. The connection leads will allow an end user to select a driver or active current limiting bypass which will allow a particular amount of current to flow through the non bypassed LEDs to create a desired level of luminance from device 200. Creating devices 200 with connection leads instead of bypasses also allows for different LED circuits to be connected to the same bypass or driver if the light needs of device 200 change. For example, device 200 may initially include a circuit which includes 20 LEDs, 10 of which are bypassed, but now requires a circuit of 40 LEDs, 10 of which are bypassed, to provide more light. Rather than have to buy a new LED lighting device having the active current limiting device already incorporated into the device, which may be more costly, the end user would be able to purchase a new LED lighting device having connection leads capable of connecting some of the LEDs to an active current limiting device the end user already has. Such is particularly advantageous if the LEDs in the lighting device fail before the active current limiting device, as a cheaper LED lighting device may be purchased to replace the failed device and the still operational current limiting device may be utilized with the new LED lighting device. Likewise, if the driver or bypass or shunt active current limiting device fails, the LED lighting device may be disconnected from the failed driver or bypass and be re-used with a new driver or bypass.

In order to drive device 200 in FIG. 14, device 200 should be integrated into a lighting system or fixture having a driver having a bridge rectifier and one or more active current limiting devices. An exemplary driver can be seen in FIG. 15. As seen in FIG. 15, driver 220 may include bridge rectifier 222 and at least two active current limiting devices, shown as CCRs 224, 226. CCR 224 may be connected to an output of the bridge rectifier to control any current flowing from the bridge rectifier, while CCR 226 may be electrically unconnected to both the bridge rectifier and CCR 224 to effectively be able to provide a bypass or shunt for LEDs in circuit 202. In order to receive and provide power, and provide an effective bypass, driver 220 may include three sets of driver connection leads. A first set of driver connection leads 228, 230 may be utilized to provide a connection between the bridge rectifier and an AC power source. A second set of driver connection leads 232, 234 may be used to connect the rectifier and associated CCR to the circuit. Connection lead 232 may, for example, extend from the output of CCR 224 and connect to connection lead 206 of device 200 to provide rectified AC power from rectifier 222 to circuit 202. Connection lead 234 may, for example, extend from the return of rectifier 222, and connect to connection lead 208 of circuit 202 to receive a return form circuit 202 to complete the circuit. Connecting leads 232, 234 and 206, 208 in this manner will provide power to each LED and active current limiting device in circuit 202 and enable the circuit to be driven.

In order to provide a bypass or shunt for one or more of the LEDs in circuit 202, the third set of connection leads 236, 238 in driver 220 should connect to the input and output of CCR 226 respectively. Connection lead 236 may then connect to connection lead 210 while connection lead 238 connects to connection 212 to effectively provide a bypass around the LEDs connected between leads 210, 212 in circuit 202. Since CCR 226 is electrically unconnected to rectifier 222 and CCR 224, it will effectively act as a bypass when connected across one or more of the LEDs in circuit 202 in a substantially identical manner as bypass CCR 110 does in FIG. 9.

Figure 16:
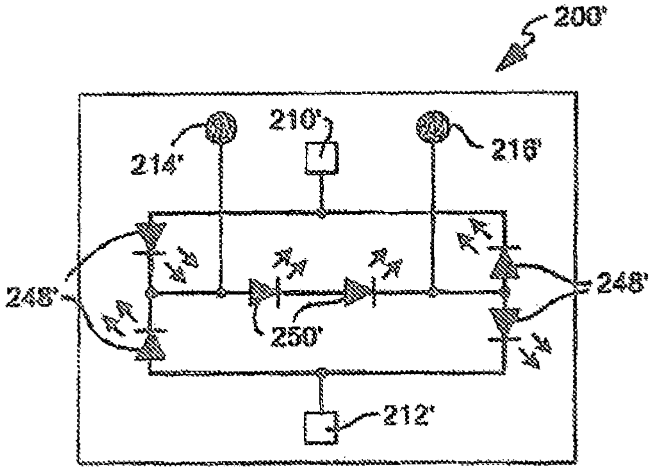
FIG. 16 shows a lighting device having multiple power connection leads for increasing power factor and reducing total harmonic distortion as contemplated by the invention.
Figure 17:
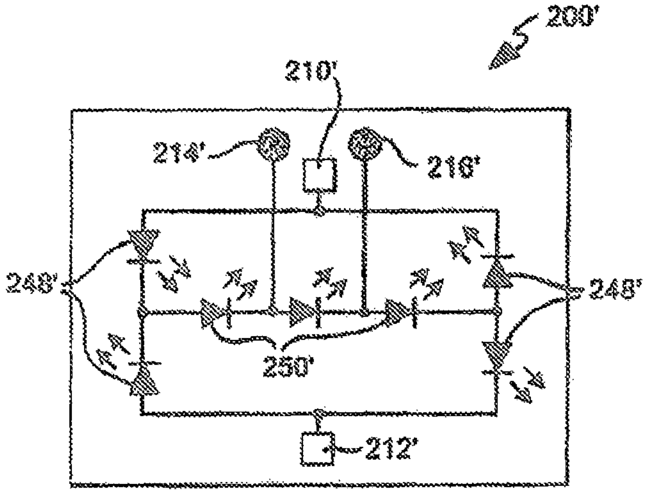
FIG. 17 shows a lighting device having multiple power connection leads for increasing power factor and reducing total harmonic distortion as contemplated by the invention.

As seen in FIGS. 16 and 17, the bypass connections may likewise be utilized in circuit 100' with a first set of connection leads 210', 212' being connected to the inputs of the bridge rectifier and one or more of the LEDs 250' connected across the output of the bridge rectifier being connected to a second set of connection leads 214', 216' in device 200'. Such a configuration would allow an end user to select a bypass of choice, with particular current limiting characteristics for driving any LEDs formed as part of the bridge rectifier 248', and/or any LEDs 250' connected across the output of the rectifier which are not bypassed by the parallel current limiting device. As described above, connection leads may also help keep the costs of the device down as end users will be able to purchase a separate active current limiting device and use it with multiple rectifier devices.

Regardless of whether an active current limiting bypass is incorporated into a device, like in FIGS. 9-13, or is externally connected to connection leads like in FIGS. 14, 16, and 17, it has been found by the inventors that the ratio of circuit efficiency is inversely proportional to the THD realized by the circuit as more or less LEDs are bypassed. For example, in a circuit having 20 LEDs, if five are bypassed the circuit may be highly efficient but realize a smaller reduction in THD. If 15 LEDs are bypassed, the circuit may be less efficient, but have a greater reduction in THD. It is therefore contemplated that the number of the two or more LEDs which are bypassed in any given circuit may be adjusted to match the desired characteristics of the end user of the lighting device. If a more efficient light is desired, then a device having fewer bypassed LEDs may be provided, while if lower THD is required a device having more LEDs bypassed may be provided. This inverse reaction to more or less LEDs being bypassed provides a further advantage to using devices having connection leads which attach to external active current limiting device bypasses, as it allows an end user to use a single active current limiting device to bypass different LED devices which may operate with greater efficiency or lower THD as is currently needed by the end user.

Figure 18:
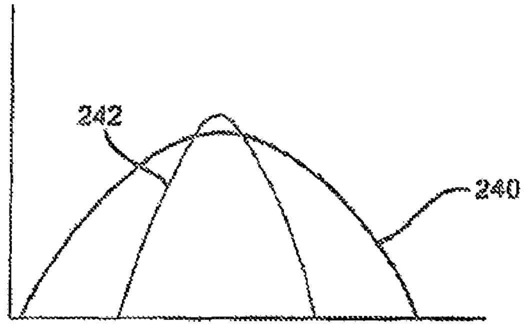
FIG. 18 PRIOR ART
FIG. 18 shows a graphical representation of an applied voltage and forward current in a known LED lighting device; and, FIG. 19 shows a graphical representation of an applied voltage and forward current in an LED lighting device having an increased power factor and reduced total harmonic distortion as contemplated by the invention.
Figure 19:
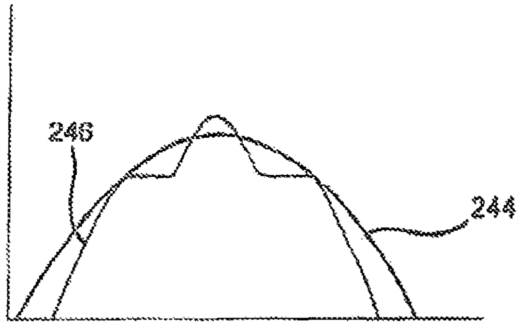

The improvement of any circuit using an active current limiting device bypass, again regardless of whether it is integrated within the device or externally connected, can be seen in FIGS. 18 and 19. FIG. 18 shows curve 240 which represents an AC input voltage to a known LED lighting device not using an active current limiting bypass and instead using a current limiting resistor, for example, and the current response curve 242 of the same device. FIG. 19 shows the same two curves, curve 244 showing an AC input voltage and curve 246 showing current, when a device having an identical number of LEDs to the circuit producing the curve in FIG. 18 is used with an active current limiting bypass as described herein. As seen in FIGS. 18 and 19, utilizing the bypass in the present invention increases power factor, as current begins flowing through the device much closer to the voltage turn on point when a bypass is used than when it is not. This better power factor is the result of the device having the bypass circuit beginning to emit light much earlier as only enough voltage to turn on the non-bypassed (and CLD if used instead of a CCR) is required for the device to begin emitting light. If each circuit includes 20 LEDs which each turn on at 2.2V, for example, and 10 LEDs are bypassed in a circuit and device as described herein, it will turn on once the provided AC voltage reaches 22V whereas the device not having the bypass will not turn on until provided AC voltage reaches 44V. The bypass allows the device to turn on much earlier, allowing light to be emitted much earlier in the provided voltage waveform, i.e. increasing the power factor. As a result of the bypass, the current response using a bypass also has a substantially reduced THD, as the current waveform better approximates the provided AC voltage.

While the foregoing there has set forth embodiments of the invention, it is to be understood that the present invention may be embodied in other forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying claims.

The invention is claimed as follows:

1. An LED lighting device comprising:

at least one LED circuit having at least two LEDs that emit a color temperature of white light, wherein a first LED of the at least two LEDs is configured to emit a different color temperature of white light than a second LED of the at least two LEDs;

a switch configured to be manually switched by a user to change the color temperature of white light that is emitted from the at least one LED circuit, wherein switching the switch changes the color temperature of light emitted from the at least one LED circuit by dimming the second LED;

a first current regulator electrically connected between the switch and the first LED that emits the different color temperature of white light, the first current regulator configured to cause the first LED to begin emitting light at a first voltage;

a second current regulator electrically connected between the switch and the second LED that emits the color temperature of white light, the second current regulator configured to cause the second LED to begin emitting light at a second voltage that is greater than the first voltage; and a housing configured to include the at least one LED circuit and the switch, wherein the lighting device is configured to receive an AC voltage input from a mains power source.

2. The LED lighting device of claim 1, wherein the housing has at least one lens.

3. The LED lighting device of claim 2, wherein the housing is configured to provide heat sinking to the at least one LED circuit.

4. The LED lighting device of claim 1, wherein the at least one LED circuit and the switch are mounted on a single substrate.

5. The LED lighting device of claim 1, wherein the switch is configured to turn on or turn off the first LED that emits light of the different color temperature of white light.

6. The LED lighting device of claim 1, further comprising a sensor electrically coupled to the at least one LED circuit, wherein the at least one LED circuit is configured to additionally change the color temperature in response to an output from the sensor.

7. An LED lighting device comprising:

at least one LED circuit having at least two LEDs that emit a color temperature of white light, wherein an LED of the at least two LEDs is configured to emit a different color temperature of white light than at least one other LED of the at least two LEDs;

a switch directly connected to the at least one LED circuit via at least one of (i) at least one resistor, or (ii) at least one transistor, the switch configured to be manually switched by a user to change the color temperature of white light that is emitted from the at least one LED circuit, wherein switching the switch changes the color temperature of light emitted from the at least one LED circuit by increasing a brightness of the LED that is configured to emit the different color temperature of white light than the at least one other LED of the at least two LEDs; and a housing configured to include the at least one LED circuit and the switch, wherein the at least one of (i) the at least one resistor or (ii) the at least one transistor is configured to cause the LED of the at least two LEDs to begin emitting light at a first voltage and cause the at least one other LED of the at least two LEDs to begin emitting light at a second voltage that is greater than the first voltage, and wherein the lighting device is configured to receive an AC voltage input from a mains power source.

8. The LED lighting device of claim 7, wherein the housing has at least one lens.

9. The LED lighting device of claim 8, wherein the housing is configured to provide heat sinking to the at least one LED circuit.

10. The LED lighting device of claim 7, wherein the at least one LED circuit and the switch are mounted on a single substrate.

11. The LED lighting device of claim 7, wherein the switch is configured to turn on or turn off the LED that emits light of the different color temperature of white light.

12. The LED lighting device of claim 7, further comprising a sensor electrically coupled to the at least one LED circuit, wherein the at least one LED circuit is configured to additionally change the color temperature in response to an output from the sensor.

13. An LED lighting device comprising:

at least one LED circuit having at least two LEDs that emit a color temperature of white light, wherein an LED of the at least two LEDs is configured to emit a different color temperature of white light than at least one other LED of the at least two LEDs;

a switch directly connected to the at least one LED circuit via at least one of (i) at least one resistor, or (ii) at least one transistor, the switch configured to be manually switched by a user to change the color temperature of white light that is emitted from the at least one LED circuit, wherein switching the switch changes the color temperature of light emitted from the at least one LED circuit by one of either dimming or increasing a brightness of the LED that is configured to emit the different color temperature of white light than the at least one other LED of the at least two LEDs; and a housing configured to include the at least one LED circuit and the switch, wherein the at least one of (i) the at least one resistor or (ii) the at least one transistor is configured to cause the LED that is configured to emit the different color temperature of white light to begin emitting light at a first voltage and cause the at least one other LED of the at least two LEDs to begin emitting light at a second voltage that is greater than the first voltage, and wherein the lighting device is configured to receive an AC voltage input from a mains power source.

14. The LED lighting device of claim 13, wherein the housing has at least one lens.

15. The LED lighting device of claim 14, wherein the housing is configured to provide heat sinking to the at least one LED circuit.

16. The LED lighting device of claim 13, wherein the at least one LED circuit and the switch are mounted on a single substrate.

17. The LED lighting device of claim 13, wherein the at least one LED circuit is dimmable.

18. The LED lighting device of claim 13, further comprising a sensor electrically coupled to the at least one LED circuit, wherein the at least one LED circuit is configured to additionally change the color temperature in response to an output from the sensor.

19. The LED lighting device of claim 13, wherein a current delivered to the LED of the at least two LEDs is reduced to control the color temperature of light emitted from the LED lighting device.

20. The LED lighting device of claim 13, wherein the switch is configured to turn on or turn off the LED that emits light of the different color temperature of white light.

* * * * *